United States Patent
Shigeta

(10) Patent No.: US 11,741,784 B2
(45) Date of Patent: Aug. 29, 2023

(54) GAME SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/832,098

(22) Filed: Jun. 3, 2022

(65) Prior Publication Data

US 2022/0392306 A1 Dec. 8, 2022

(30) Foreign Application Priority Data

Jun. 4, 2021 (JP) .................................. 2021-094369

(51) Int. Cl.
  *G07F 17/00* (2006.01)
  *G07F 19/00* (2006.01)
  *G07F 17/32* (2006.01)
(52) U.S. Cl.
  CPC ...... *G07F 17/3251* (2013.01); *G07F 17/3288* (2013.01); *G07F 17/3293* (2013.01)
(58) Field of Classification Search
  CPC .... G07F 17/32; G07F 17/3211; G07F 17/322; G07F 17/3223; G07F 17/3227; G07F 17/3262; G07F 17/3288; G07F 17/3293
  See application file for complete search history.

(56) References Cited

U.S. PATENT DOCUMENTS

| 8,366,112 | B1 * | 2/2013 | Nasibyan | G07F 17/322 463/36 |
| 8,684,830 | B1 * | 4/2014 | Chun | G07F 17/322 463/25 |
| 10,099,132 | B2 * | 10/2018 | Yamakawa | A63F 13/57 |
| 10,380,829 | B2 * | 8/2019 | Takasaki | G07F 17/3227 |

(Continued)

FOREIGN PATENT DOCUMENTS

| JP | 2008173477 A | 7/2008 |
| JP | 2008206811 A | 9/2008 |

(Continued)

OTHER PUBLICATIONS

International Search Report dated Jul. 12, 2022 issued in PCT Application PCT/JP2022/021853.

(Continued)

*Primary Examiner* — Milap Shah
(74) *Attorney, Agent, or Firm* — NORTON ROSE FULBRIGHT US LLP

(57) ABSTRACT

A game system for participating in a baccarat game includes a bet area includes: a plurality of betting terminals separated from the game table, including a plurality of bet targets including a player win area and a banker win area, and in which a bet is performed by placing a physical token at any of the bet targets; a bet determining device configured to determine a bet target at which the physical token is placed and an amount thereof; and a collecting device and a payment device configured to collect the betted physical token or pay out for the betted physical token based on the bet target and the amount determined by the bet determining device and a result of a baccarat game.

26 Claims, 37 Drawing Sheets

(56) References Cited

U.S. PATENT DOCUMENTS

| | | | |
|---|---|---|---|
| 2006/0071429 A1* | 4/2006 | Okujyo | G07F 17/3293 273/292 |
| 2006/0217199 A1* | 9/2006 | Adcox | G07F 17/3223 463/40 |
| 2008/0176622 A1 | 7/2008 | Okada | |
| 2008/0207292 A1 | 8/2008 | Yoshizawa | |
| 2009/0233699 A1 | 9/2009 | Koyama | |
| 2009/0253493 A1* | 10/2009 | Yoshizawa | G07F 17/3213 463/30 |
| 2010/0048275 A1 | 2/2010 | Yoshizawa | |
| 2013/0005439 A1 | 1/2013 | Okujo et al. | |
| 2013/0005440 A1* | 1/2013 | Okujo | G07F 17/323 463/25 |
| 2013/0005455 A1 | 1/2013 | Okujo et al. | |
| 2013/0005456 A1 | 1/2013 | Okujo et al. | |
| 2013/0281175 A1* | 10/2013 | MacDonald | G07F 17/322 463/13 |
| 2019/0236891 A1 | 8/2019 | Shigeta | |
| 2020/0334942 A1 | 10/2020 | Feng | |

FOREIGN PATENT DOCUMENTS

| | | |
|---|---|---|
| JP | 2009219588 A | 10/2009 |
| JP | 2013013471 A | 1/2013 |
| WO | 2008088870 A1 | 7/2008 |
| WO | 2015107902 A1 | 7/2015 |

OTHER PUBLICATIONS

Australian Examination Report dated Aug. 8, 2022 issued in AU Application 2022203845.

* cited by examiner

GAME SYSTEM

CROSS-REFERENCE OF RELATED APPLICATIONS

This application claims the benefit of JP Pat. App. No. 2021-094369 filed Jun. 4, 2021, the contents of which are incorporated herein by reference.

TECHNICAL FIELD

The present invention relates to a game system for participating in a baccarat game.

BACKGROUND

Conventionally, a plurality of baccarat tables for playing a baccarat game is provided in a casino. In the baccarat table, a dealer is positioned on one side and player positions for players are arranged facing the dealer on the other side. A bet area is provided in each player position, on which the player bets gaming chips.

The dealer draws playing cards in order from a shoe to complete a player hand and a banker hand. Before the dealer starts drawing the playing cards, the player predicts whether the player hand wins (player win) or the banker hand wins (banker win) and places gaming chips to be betted on an area corresponding to the predicted hand in the bet area, thereby participates in the game.

When a number of players participating in the game is more than the number of player positions provided at the table, a plurality of players may bet on one bet area provided in one player position. Regarding the player who sit at the player position and bets on the bet area (sitting player), it is referred as a back betting to bet on the same bet area from behind the player without sitting at the player position, and the player who performs the back bet is referred to as a back bettor.

Since the back betting causes the gaming chips of the plurality of players betted on one bet area, confusion may occur in a collection of the gaming chips betted (hereinafter referred to as "betted chips") and a payment for the betted chips after a game result is decided. In addition, the back bettor must operate the game chips at the table while standing and thrusting forward, and this is inconvenient.

Although providing more baccarat tables allows to deal with more players, some casinos do not have enough space for baccarat tables.

In addition, some players who are not familiar with the baccarat game may be hesitant to participate in the same game at the same gaming table as other players. In addition, in the baccarat, the player who bets the highest amount is given the right to turn over (squeeze) a playing card of a betted hand. It is one of pleasures of the baccarat to check the betted hand by oneself while narrowing possibilities of rank by turning over only edges of a short side or a long side of the playing card. There are players who do not understand how to enjoy this squeeze among the players unfamiliar with the baccarat game, and this point is another factor to hesitant to play at the game table together with other players.

SUMMARY

Therefore, an object of the present invention is to provide an environment in which many players can play conveniently regarding one game table. Another object of the present invention is to provide an environment in which even player unfamiliar with the baccarat game can easily participate in the game.

In a game system according to an aspect of the present invention, the game system for participating in a baccarat game includes a configuration including: a plurality of betting terminals separated from a game table, including a bet area including a plurality of bet targets including a player win area and a banker win area, and in which a bet is performed by placing a physical token at any of the bet targets; a bet determining device configured to determine the bet target at which the physical token is placed and an amount thereof; and a settlement device configured to collect the betted physical token or pay out for the betted physical token based on the bet target and the amount determined by the bet determining device and a result of the baccarat game; and wherein the physical token includes an RFID tag, and the bet determining device is configured to read the RFID tag of the physical token to determine the bet target at which the physical token is placed and the amount thereof; and/or the bet determining device includes a camera configured to image the physical token placed at the bet area, and an image analyzing device configured to analyze the image of the camera to determine the bet target at which the physical token is placed and the amount thereof; and wherein the settlement device includes a collection accommodating portion configured to accommodate the collected physical token, a colleting and moving means configured to move the physical token lost by a player in the baccarat game to the collection accommodating portion, a payment accommodating portion configured to accommodate the physical token to be paid out, and a payment moving means configured to move the physical token to be paid out for the physical token won by the player in the baccarat game from the payment accommodating portion.

This configuration allows players to participate in the baccarat game being played at the game table outside the game table and more players to participate in the game. In addition, players using the betting terminal can participate in the baccarat game without worrying about the presence of other players.

In the above game system, the payment moving means may include a movable bet area at which the betted physical token is placed, or a pushing-out member configured to apply to and move the betted physical token.

In the above game system, the collection accommodating portion may be provided independently for each betting terminal.

In the above game system, a plurality of the betting terminals may be arranged side by side, the collection accommodating portion may be common to the plurality of betting terminals, and the collecting and moving means may include a collecting mechanism configured to collect the physical token from each of the plurality of betting terminals and move the physical token to the collection accommodating portion.

The above game system may further include: a central collection accommodating portion configured to collect the physical token collected from a plurality of collection accommodating portions; and a central collecting mechanism configured to collect the physical token from each of the plurality of collection accommodating portions and move it to the central collection accommodating portion.

In the above game system, the payment accommodating portion may be provided independently for each betting terminal.

In the above game system, the payment accommodating portion and the collection accommodating portion may be common.

The above game system may further include a transferring means configured to transfer the physical token accommodated in the collection accommodating portion to the payment accommodating portion.

The above game system may further include an assorting means configured to assort the physical token collected in the collection accommodating portion by an amount thereof and accommodate it in the payment accommodating portion.

In the above game system, the betting terminal may include a fraud preventing device preventing a bet from being changed at least during a game.

In the above game system, the fraud preventing device may include a cover member configured to cover the physical token to prevent a player from touching the betted physical token.

In the above game system, the covering member may be configured to move to a position where the covering member covers the betted physical token before a bet is completed and a game begins, and retreat to a position where the player can touch the paid-out physical token at the latest after a settlement of the game is completed.

In the above game system, the fraud preventing device may include an alarming device configured to output an alarm at least when the betted physical token is changed during the game.

In the above game system, the fraud preventing device may include an alarming device configured to output an alarm at least when the player touches or tries to touch the betted physical token during the game.

In the above game system, a plurality of types of the physical token may be betted in the betting terminal.

The above game system may further include: a table at which a playing card of the baccarat game is dealt; and a game result judging device configured to judge a result of the baccarat game.

In the above game system, the game table may include a bet area including a plurality of bet targets including a player win area and a banker win area and a plurality of playing positions for betting by placing a physical token on the bet targets.

In the above game system, the game table may include no bet area.

The above game system may further include a monitor configured to display a baccarat game being played on the game table for a player using the betting terminal.

The above game system may further include a camera configured to image the baccarat game in the game table, and wherein the monitor is configured to display the baccarat game imaged by the camera.

In the above game system, the monitor may be configured to display a playing card being squeezed at the game table as a display of the baccarat game.

The above game system may include: a hand judging device configured to judge a player hand and a banker hand turned face up; and a guiding device configured to determine a relationship between some or all of information about a rank of a playing card revealed by a squeeze and a game result regarding the playing card being face down based on a rule of the baccarat game, and wherein the monitor is configured to display the relationship determined by the guiding device as a display of the baccarat game.

In the above game system, the monitor may be configured to display at least an amount of each physical token being betted at a plurality of the betting terminals.

The above game system may further include a card reader configured to read a member card to identify a player associating with the betting terminal, and wherein the card reader is configured to read the member card to identify the player playing in the betting terminal.

The above game system may further include: a camera configured to image a face of a player playing in the betting terminal; and an analyzing device configured to analyze the face image imaged by the camera to identify the player playing in the betting terminal.

The above game system may further include: a camera configured to image at least the betting terminal including the bet area and at least a portion of a player playing in the betting terminal; and a recording device configured to record the image imaged by the camera.

DESCRIPTION OF THE PREFERRED EMBODIMENTS

Figure 1:
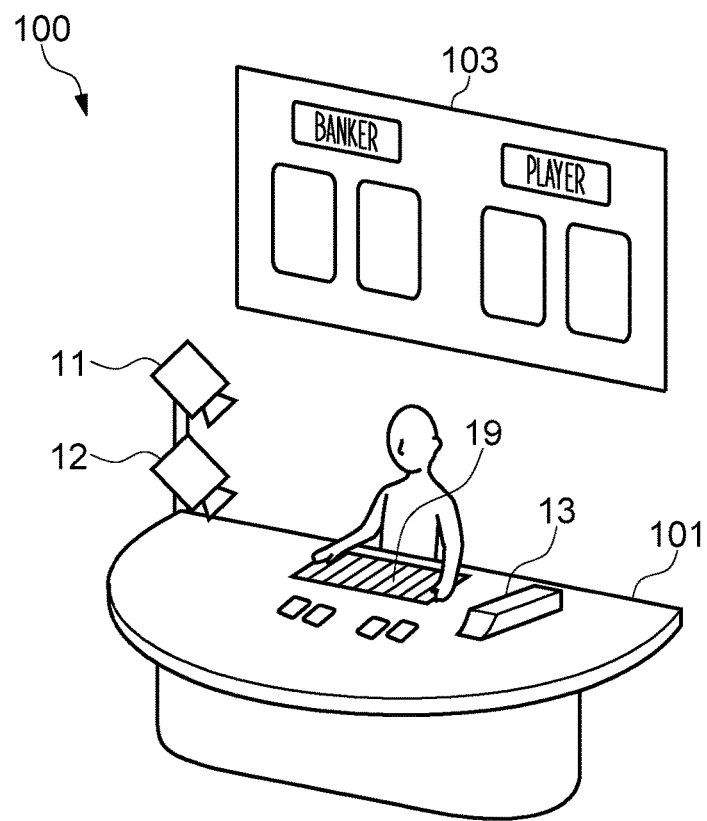
FIG. 1 shows a view of the overall configuration of a game system of a first embodiment of the present invention.
Figure 1:
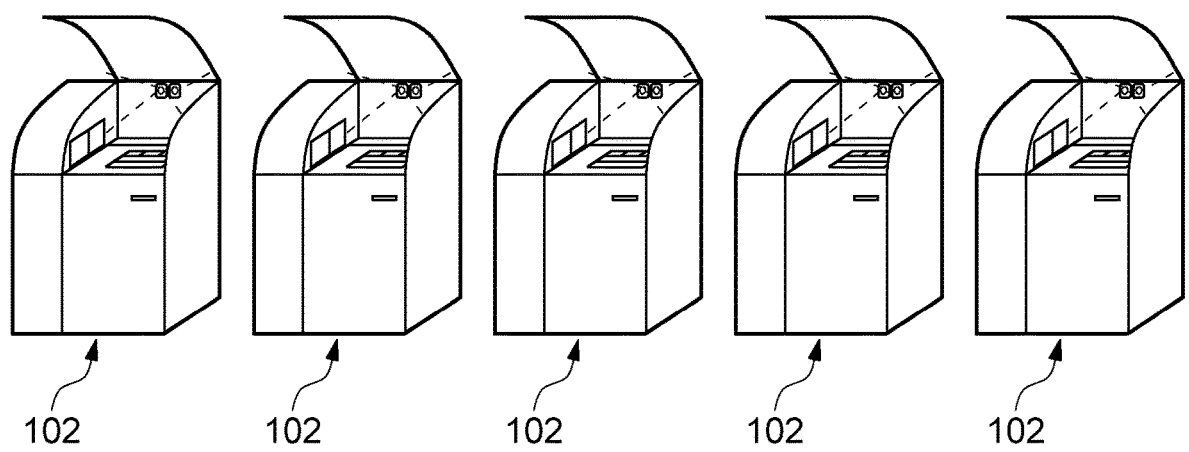

FIG. 1 shows a view of an overall configuration of a game system of a first embodiment of the present invention. The game system 100 is a system for playing baccarat games. The game system 100 includes a game table 101 on which playing cards are dealt, and a plurality of betting terminals 102 that separates from the game table 101. The plurality of betting terminals 102 is arranged around one game table 101. The betting terminals 102 may be arranged in multiple rows. A large monitor 103 is provided near the game table 101 and is large enough to be viewed directly by players using the plurality of betting terminals 102.

The game table 101 includes a card imaging camera 11, a squeeze imaging camera 12, and an electronic shoe 13. The game table 101 is a regular baccarat table, and players can also participate in the games at this table. For this purpose, a chip tray 19 is provided with the game table 101, and a bet area is provided with each of a plurality of player positions, which includes a plurality of bet targets including a player win area and a banker win area.

The card imaging camera 11 images the baccarat games in the game table. Specifically, the card imaging camera 11 images cards dealt by the dealer, i.e., cards pulled out of the electronic shoe 13 onto the game table 101 and being face down. The squeeze imaging camera 12 images a squeezing operation at the game table 101. The electronic shoe 13 accommodates a plurality of decks of shuffled playing cards. The dealer draws the playing cards from the electronic shoe 13 to complete a player hand and a dealer hand in accordance with game progress.

The large monitor 103 displays the images or videos imaged by the card imaging camera 11, the images or videos imaged by the squeeze imaging camera 12, and other game guide information.

Although not shown in the figures, a means may be provided, which identifies gaming chips betted in the bet area provided with each of the plurality of player positions in the game table 101. The table system 150 may, for example, include a camera that images the betted gaming chips, and an image analyzing device that analyzes the images of the betted gaming chips to identify a position, type and number of betted gaming chips. Alternatively, an RFID tag may be built-in the gaming chip and store at least type-identifiable information, and an RFID antenna may be provided with the bet area and read the RFID tag of the gaming chip placed on the bet area to identify a position, type and number of betted gaming chips.

Figure 2:
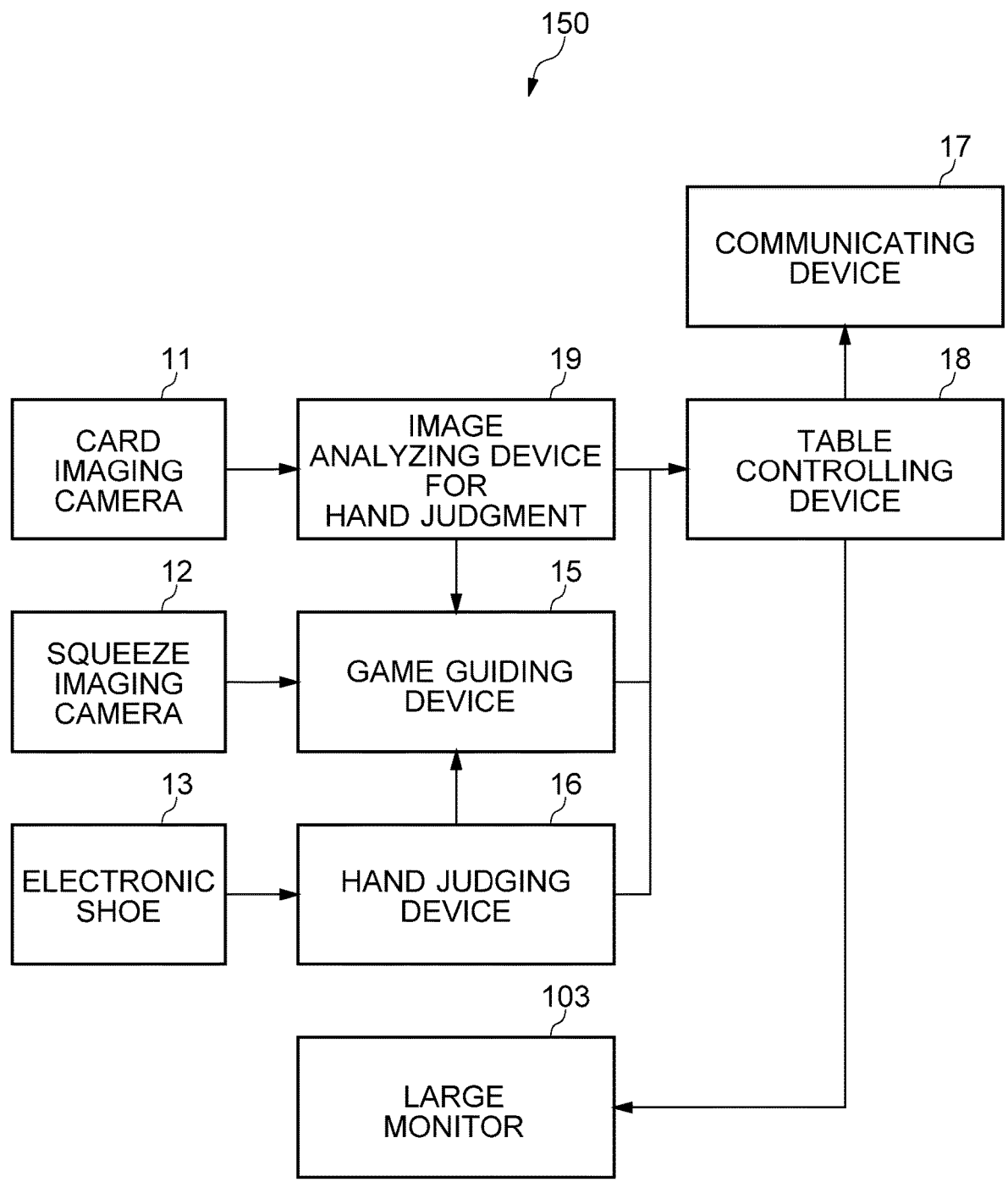
FIG. 2 shows a block diagram of a table system of the first embodiment of the present invention.

FIG. 2 is a block diagram of the table system of the first embodiment of the present invention. The table system 150 includes the card imaging camera 11, the squeeze imaging camera 12, the electronic shoe 13, an image analyzing device for hand judgment 14, a game guiding device 15, a hand judgment device 16, a large monitor 103, a communicating device 17, and a table controlling device 18.

The image analyzing device for hand judgment 14 analyzes the images obtained by the imaging of the card imaging camera 11 to judge the player hand and the banker hand. Machine learning techniques such as neural networks may be used for this image analysis. The image analyzing device for hand judgment 14 may be divided into a device that recognizes playing cards in an image, a device that identifies ranks of the recognized playing cards, and a device that judges a player hand and a banker hand based on the identified rank, respectively. The image analyzing device for hand judgment 14 further judges a game result (player win, banker win, tie, player pair, banker pair) based on the judged player hand and banker hand.

The hand judging device 16 includes a sensor provided with the electronic shoe 13 and reads ranks of playing cards drawn from the electronic shoe. The hand judging device 16 judges a player hand and a banker hand based on the ranks read using the sensor. The electronic shoe 13 further includes functions as a game result judging device that judges a game result based on the judged player hand and banker hand. Since both the image analyzing device for hand judgment 14 and the hand judging device 16 include the same function of judging the player hand and the banker hand to judge the game result based thereon, either one of them may be omitted.

The game guiding device 15 generates guide information to guide the game based on the player hand and the banker hand judged by the image analyzing device for hand judgement 14 and the hand judging device 16. This guide information is displayed on the large monitor 103 via the table controlling device 18.

The game guiding device 15 generates the game guide information in the following manner. First, the game guiding device 15 obtains information on the player hand and the banker hand from the hand judging device 16. Next, the game guiding device 15 obtains information on a rank of an opened playing card from the image analyzing device for hand judgment 14 when the player hand or the banker hand is only partially opened. This allows the game guide system 15 to know a rank of a playing card that is not yet opened, i.e., a playing cards that is an object of a squeeze, from the information obtained from the hand judgment device 16.

In this state, the game guiding device 15 determines how many values a hand is to take depending on what a rank of a playing card that is an object of a squeeze. Alternatively, when all hands other than a hand to be squeezed are open, it is determined whether hand is to win depending on what rank a playing card to be squeezed is to take. The game guiding device 15 outputs the determined contents as the game guide information to the table controlling device 18.

In the game guiding device 15, the rank of the playing card to be squeezed are known based on the information from the hand judging device 16. Therefore, the game guiding device 15 generates an animation that exposes a part of the long side and a part of the short side of the playing card being squeezed, respectively, accompanying with the squeezing operation. Further, the game guiding device 15 determines a relationship between some or all of the information about the rank of the playing card to be revealed by the squeeze and a game result regarding the playing card being face down based on rules of the baccarat game. The game guiding device 15 also outputs this animation and the relationship between the some or all of the information and the game result as the game guide information to the table controlling device 18.

The table controlling device 18 determines a state of game progress and a game result based on the information from the image analyzing device for hand judgment 14 and the hand judging device 16, and controls a display on the large monitor 103 thereon. When squeezing, the table controlling device 18 displays the image imaged by the squeeze imaging camera 12 together with the above game guide information on the large monitor 103. The communicating device 17 transmits the player and banker hand, the game result, the game guide information and so on according to the game progress and the game results determined by the table controlling device 18 to the plurality of betting terminals 102.

Figure 3:
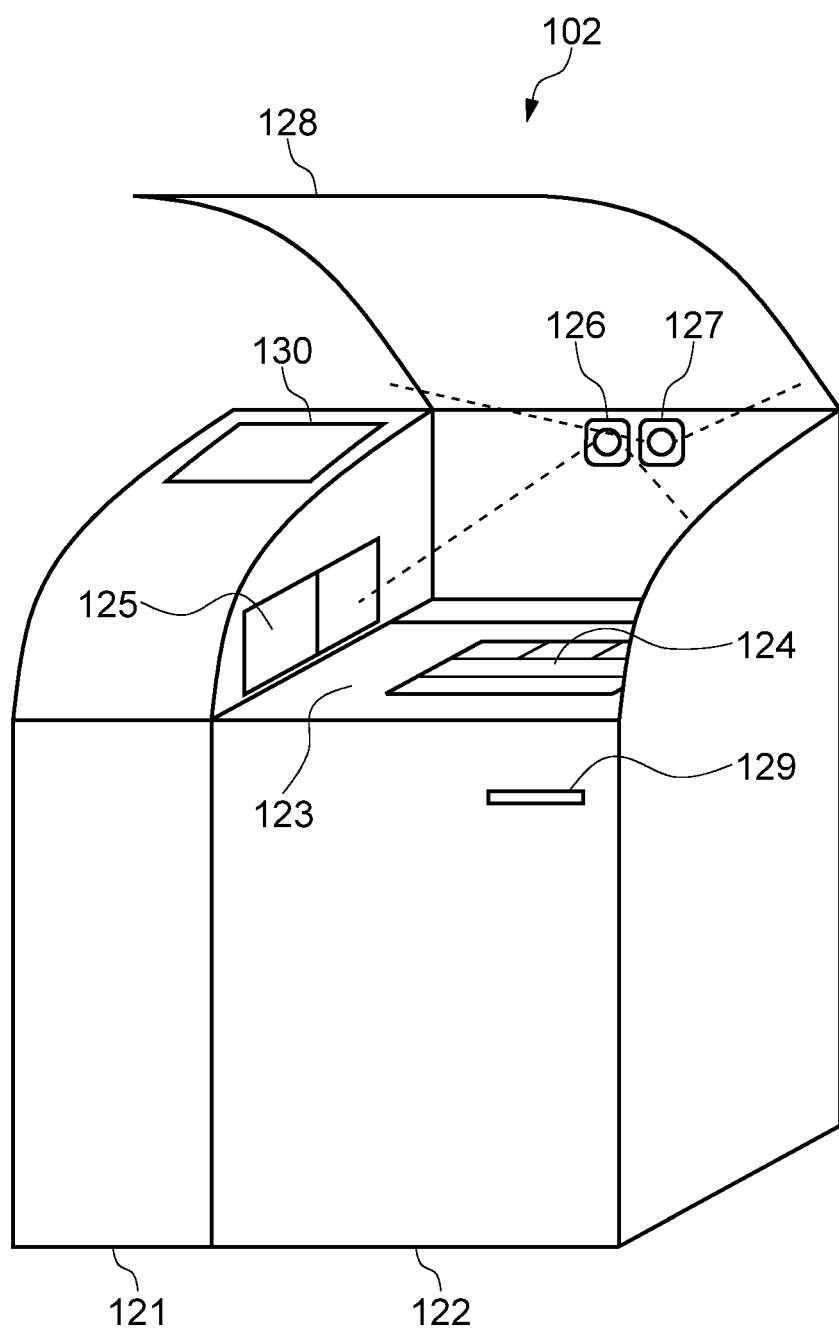
FIG. 3 is an external view of a betting terminal of the first embodiment of the present invention.

FIG. 3 shows an external view of the betting terminal of the first embodiment of the present invention. One betting terminal 102 is used by one player. The betting terminal 102 includes a payment body 121 and a betting and collecting body 122. The betting and collecting body 122 includes a chip placing surface 123 on which gaming chips as physical tokens are placed. A bet area 124 is drawn on the chip placing surface 123 and includes a plurality of bet targets including a player win area and a banker win area. A player bets by placing a gaming chip on any of the bet targets.

Side walls are provided on the left and right sides of the bet area 124 and a wall is provided on the back side thereof. The side surface of the payment body 121 is the left side wall of the bet area 124. A window 125 is provided with the side surface of the payment body 121 that serves as the side wall of the bet area 124, which is for moving gaming chips paid out from the payment body 121 to the chip placing surface 123.

A betting imaging camera 126 and a face imaging camera 127 are provided with the back wall, the betting imaging camera 126 images gaming chips placed on the bet area 124, and the face imaging camera 127 images the faces of players using the betting terminal 102. In addition, a cover member 128 is provided with the betting and collecting body 122, and matches the top of the back wall, both side walls and the front edge of the chip placing surface 123. The cover member 128 is rotatable around the top edge of the back wall. The cover member 128 is a transparent member. A slot 129 for inserting a member card is provided at the front face. A monitor 130 is provided at the top surface of the payment body 121.

Figure 4:
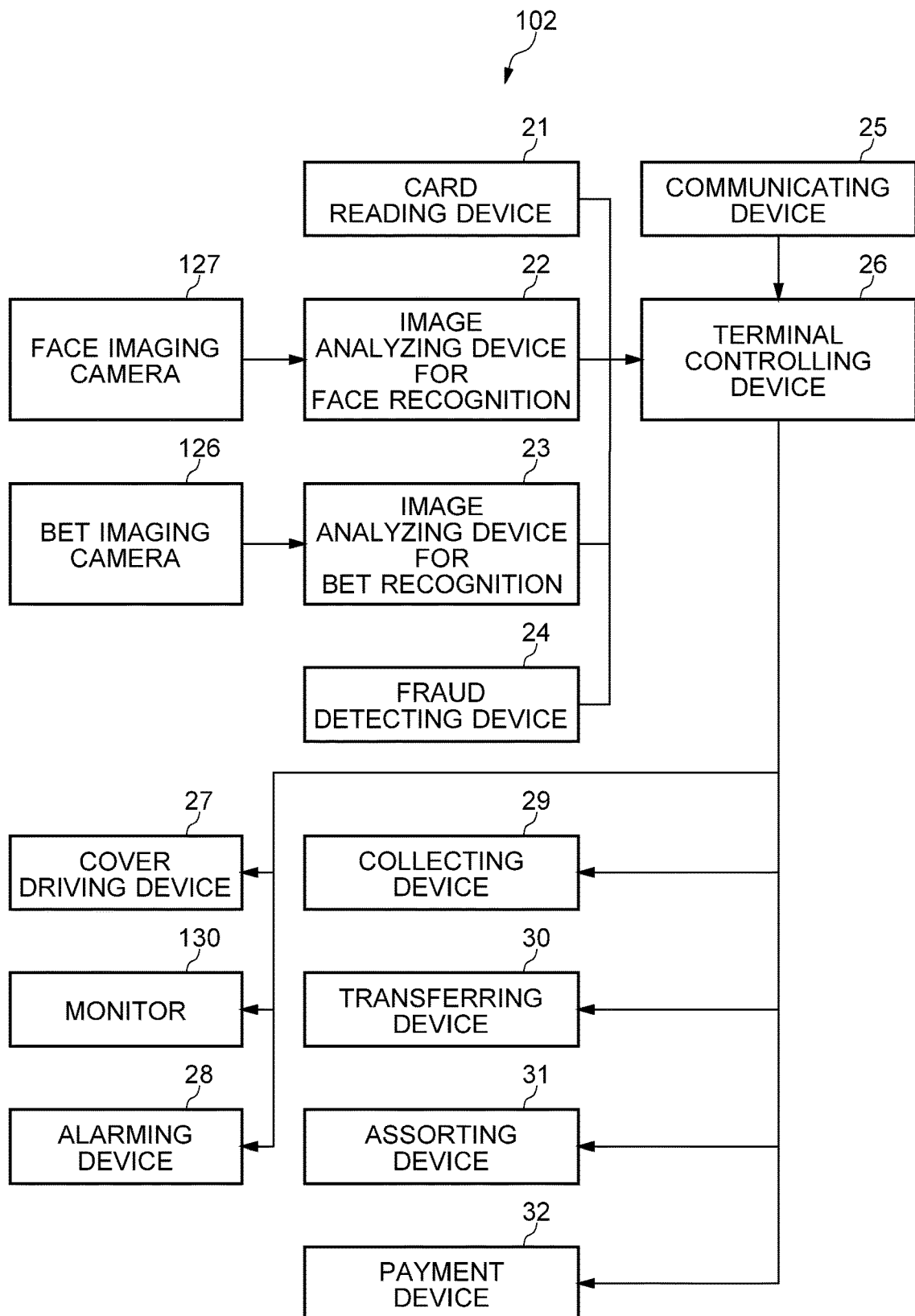
FIG. 4 shows a block diagram of the betting terminal of the first embodiment of the present invention.

FIG. 4 is a block diagram of the betting terminal of the first embodiment of the present invention. The betting terminal 102 includes the face imaging camera 127, the bet imaging camera 126, a card reader 21, an image analyzing device for face recognition 22, an image analyzing device for bet recognition 23, a fraud detecting device 24, a communicating device 25, and a terminal controlling device 26.

The face imaging camera 127 images the face of a player using the betting terminal 102 and generates images. The image analyzing device for face recognition 22 analyzes the images generated by the face imaging camera 127 to identify the player. Players who are members register their face images in advance, and the image analyzing device for face recognition 22 identifies which of the registered face images the generated face image matches to identify the player. Machine learning techniques such as neural networks may apply to this player identification.

The bet imaging camera 126 images gaming chips betted on the bet area to generate images. The image analyzing device for bet recognition 23 analyzes the images generated by the bet imaging camera 126 to determine a bet target on which the gaming chips are betted (i.e., a position on which the gaming chips are placed), and types and a number of gaming chips. The image analyzing device for bet recognition 23 further calculates an amount of gaming chips betted at each of the bet targets based on the information on the types and number of gaming chips.

The bet imaging camera 126 and the image analyzing device for bet recognition 23 form a bet determining device. A recording device may be provided, which records the images imaged by the face imaging camera 127 and the bet imaging camera 126.

It is noted that an RFID tag may be built-in the gaming chip, which store at least type-identifiable information, an antenna may be built-in the chip placing surface 123, which reads the RFID tag, an RFID reader may be connected to the antenna, and those antenna and RFID reader form the determining device.

Figure 5:
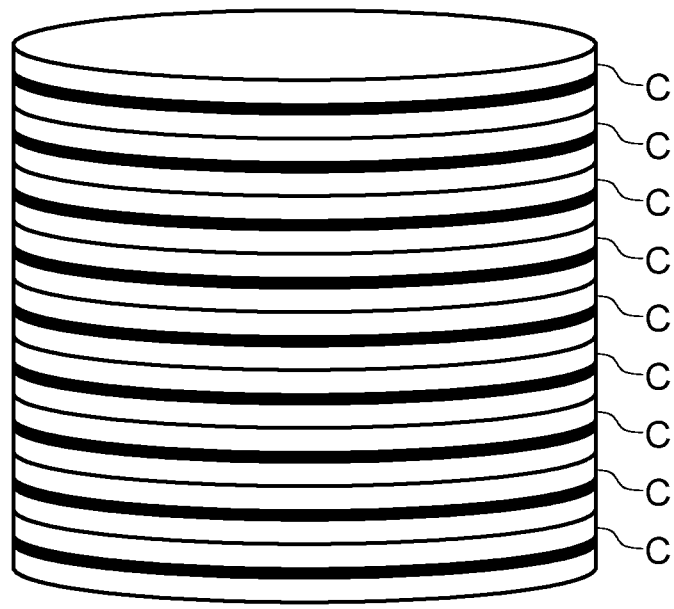
FIG. 5 shows a view of physical tokens of the first embodiment of the present invention.

FIG. 5 shows a view of a physical tokens of the first embodiment of the present invention. A gaming chip C as the physical token forms a plate shape, and includes a center line that represents its type (value type) on its side surface. A color of the center line is defined for each type, and the type of the gaming chip can be identified by identifying the color of the center line. Since the type can be identified by the center line on the side surface, the type of each gaming chip C can be identified even when multiple gaming chips are stacked to form a stack as shown in FIG. 5. In addition, a number of gaming chips C can be counted by the number of center lines.

Returning to FIG. 4, the image analyzing device for bet recognition 23 obtains the image shown in FIG. 5 from the bet imaging camera 126, extracts the stack of the gaming chips from this image, extracts the center line from the stack, and identifies the color of the center line. The image analyzing device for bet recognition 23 determines the bet target on which the stack is placed according to the position from which the stack is extracted, and determines the type of each gaming chip C according to the color of the center line. The image analyzing device for bet recognition 23 may use machine learning techniques such as neural networks for each of the extraction of the stack, the extraction of the center line and the identification of the color of the center line.

The card reader 21 reads information from a member card, not shown, inserted into the slot 129. The member card stores information that identifies the player. When a player who is a member participates in a game using the betting terminal 102, the player reads the member card with the card reader 21.

The fraud detecting device 24 detects a fraud by a player participating in a game at the betting terminal 102. The fraud detection is described below.

The terminal controlling device 26 obtains information from the card reader 21, the image analyzing device for face recognition 22, the image analyzing device for bet recognition 23, the fraud detection unit 24 and the communicating device 25, and performs various controls of the betting terminal 102. Specifically, the terminal controlling device 26 controls a cover driving device 27, the monitor 130, an alarming device 28, a collecting device 29, a transferring device 30, an assorting device 31 and a payment device 32.

The cover driving device 27 drives the cover member 128. As described above, the cover member 128 is rotatable around the back wall. When a player bets (betting phase), the cover member 128 is open, and when the betting time is finished, the cover member 128 is closed such that the player cannot reduce or increase the betted gaming chips C until the game is finished. The terminal controlling device 26 controls the cover driving device 27 to open and close the cover member 128 according to information on a phase received at the communication unit 25.

Phases of game include a betting phase in which a player can freely bet, a gaming phase from a start of a game to a decision of a game result, and a settlement phase in which a collection of and a payment for the betted chips is performed according to the decided game result. In this embodiment, the terminal controlling device 26 controls the cover driving device 27 to close the cover member 128 so as to prevent the player from accessing the chip placing surface 123 in the gaming phase and the settlement phase, and to retract (open) the cover member 128 so as to allow the player to access the chip placing surface 123 after the settlement phase is finished.

The cover member 128 and the cover driving device 27 forms a fraud preventing device. This fraud preventing device prevents a player from touching the betted gaming chips C to prevent the player from changing the bet in the gaming phase and the settlement phase. Information on the phase of game is generated by the table controlling device 18 and is given to the terminal controlling device 26 via the communicating device 17 and the communicating device 25.

The monitor 130 displays various game-related information. Specifically, for example, the monitor 130 displays the information on the player identified by the image analyzing device for face recognition 22, the bet amount of the player identified by the image analyzing device for bet recognition 23, the information on the player hand and the banker hand sent from the game table 101, the information on the game result, and the game guide information generated by the game guiding device 15 and so on.

The alarming device 28 issues an alarm in response to the detection of a fraud by the fraud detecting device 24. The alarm issued by the alarming device 28 may be transmitted to other computers as electronic data, or may be output in a perceivable manner, for example, as light or sound in the betting terminal 102.

Figure 6:
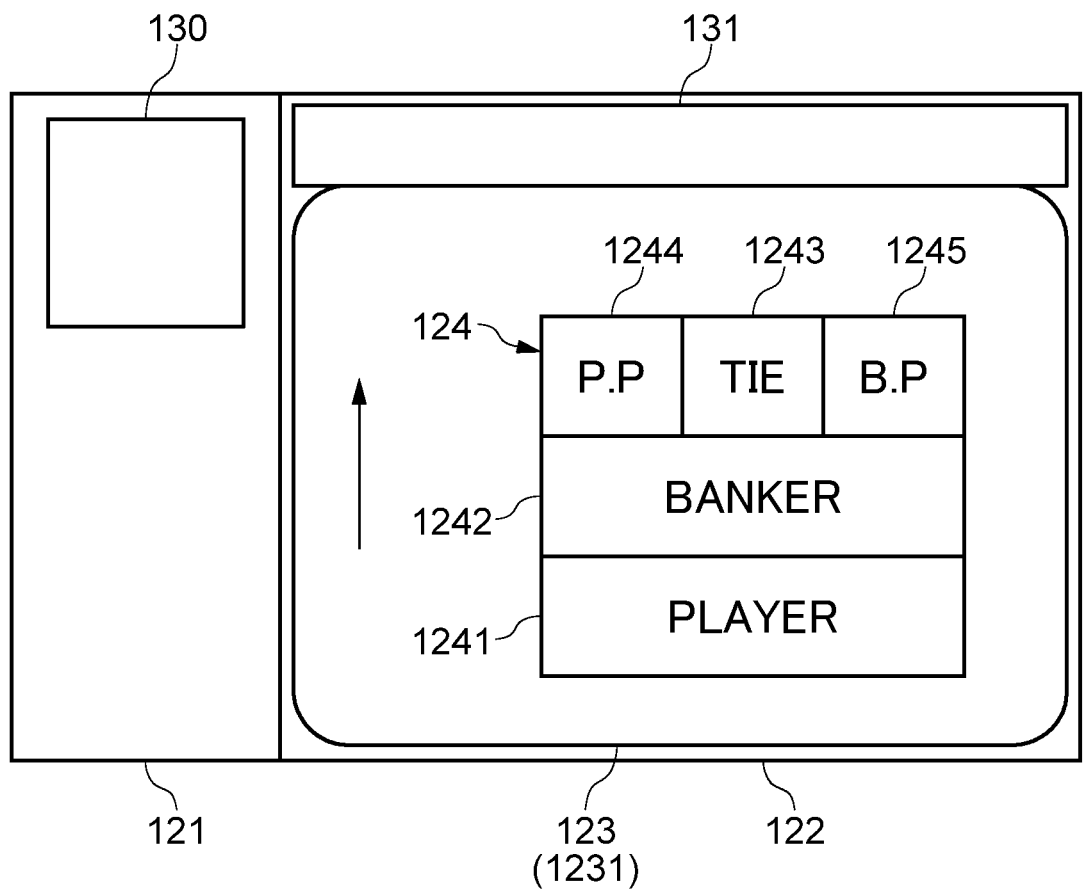
FIG. 6 shows a view of a chip placing surface of the first embodiment of the present invention.
Figure 7:
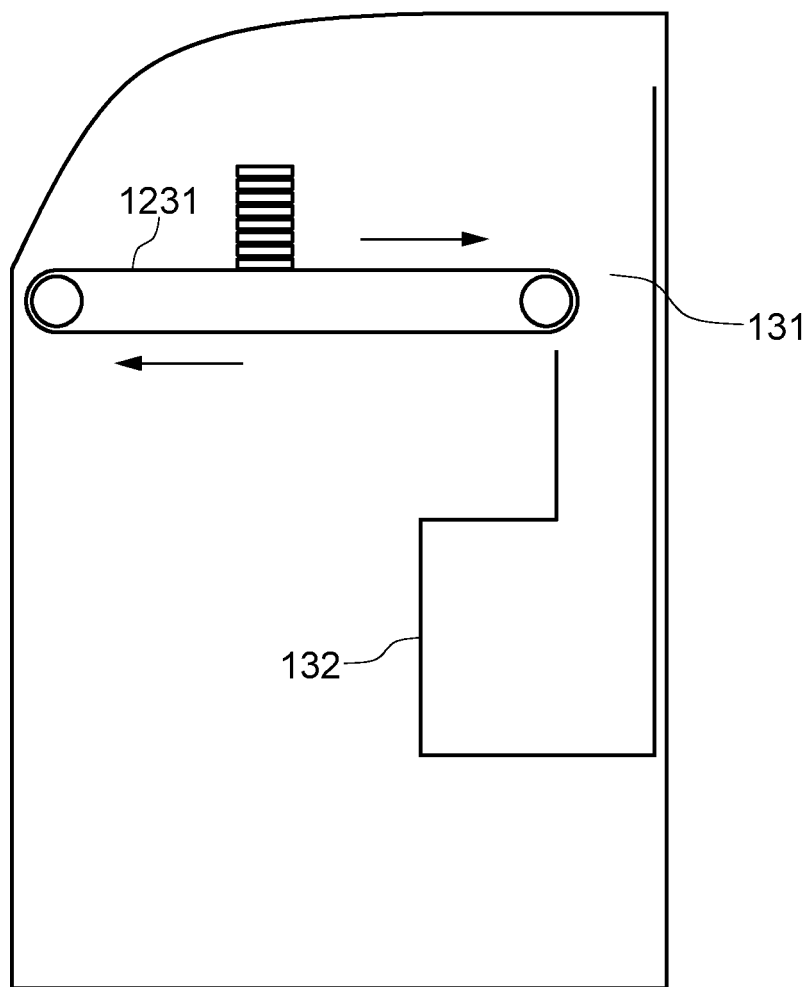
FIG. 7 shows a side cross-sectional view of the betting terminal of the first embodiment of the present invention.

FIG. 6 shows the chip placing surface of the first embodiment of the present invention. FIG. 7 is a side cross-sectional view of the betting terminal of the first embodiment of the present invention. In the examples of FIGS. 6 and 7, the chip placing surface 123 is formed by a belt conveyor 1231. That is, the chip placing surface 123 with the bet area is movable. The bet area 124 are drawn in the chip placing surface 123, which includes a player win area 1241, a banker win area 1242, a tie area 1243, a player pair area 1244 and a banker pair area 1245 as the bet targets.

A player participates in a game by placing own gaming chips C on any of the bet targets in the betting phase. When the betting phase is finished, the cover driving device 27 is activated, the cover member 128 is closed, and the chip placing surface 123 is covered by the cover member 128. This prevents the player from touching the betted gaming chips C. In the subsequent gaming phase, the cover member 128 and the belt conveyor 1231 do not move, and when entering into the settlement phase, the belt conveyor first turns half cycle in the direction of the arrows in FIGS. 6 and 7.

Figure 8:
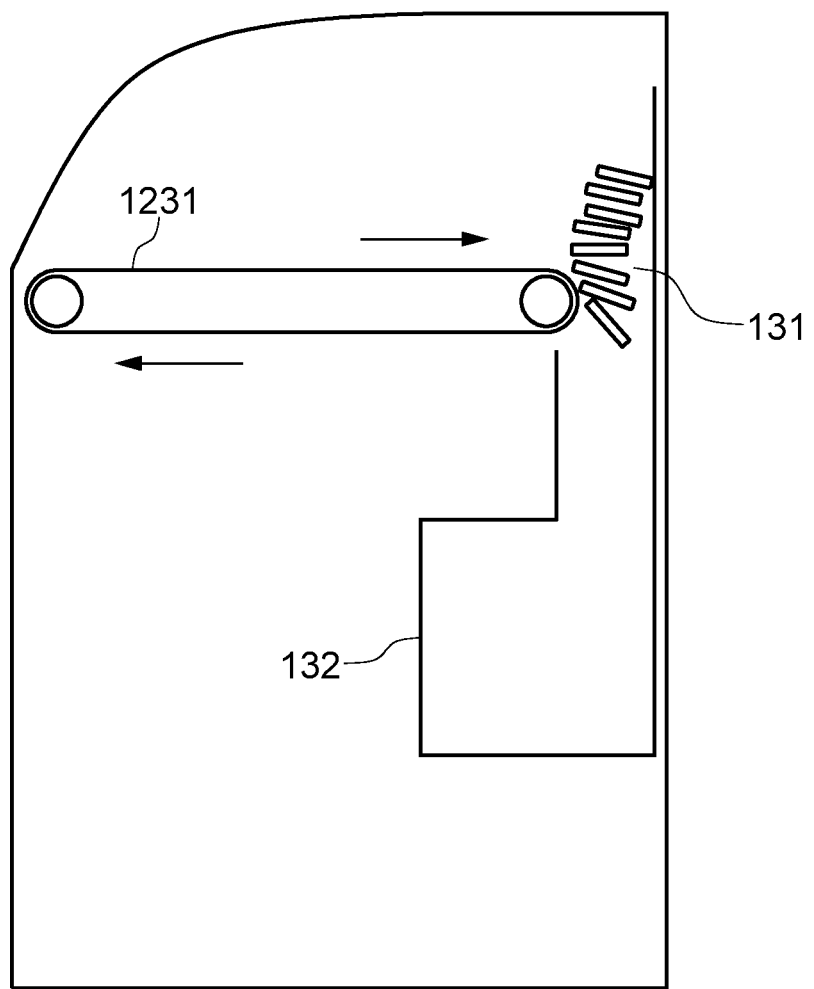
FIG. 8 shows a side cross-sectional view of the betting terminal of the first embodiment of the present invention.

FIG. 8 is a side cross-sectional view of the betting terminal of the first embodiment. As the belt conveyor rotates, as shown in FIG. 8, all the betted gaming chips C fall from a collecting opening 131 at the back of the belt conveyor 1231, and are collected in a collecting box 132 as a collection accommodating portion. When the betted gaming chips are chips that should be collected, thereby settlement is completed.

Figure 9:
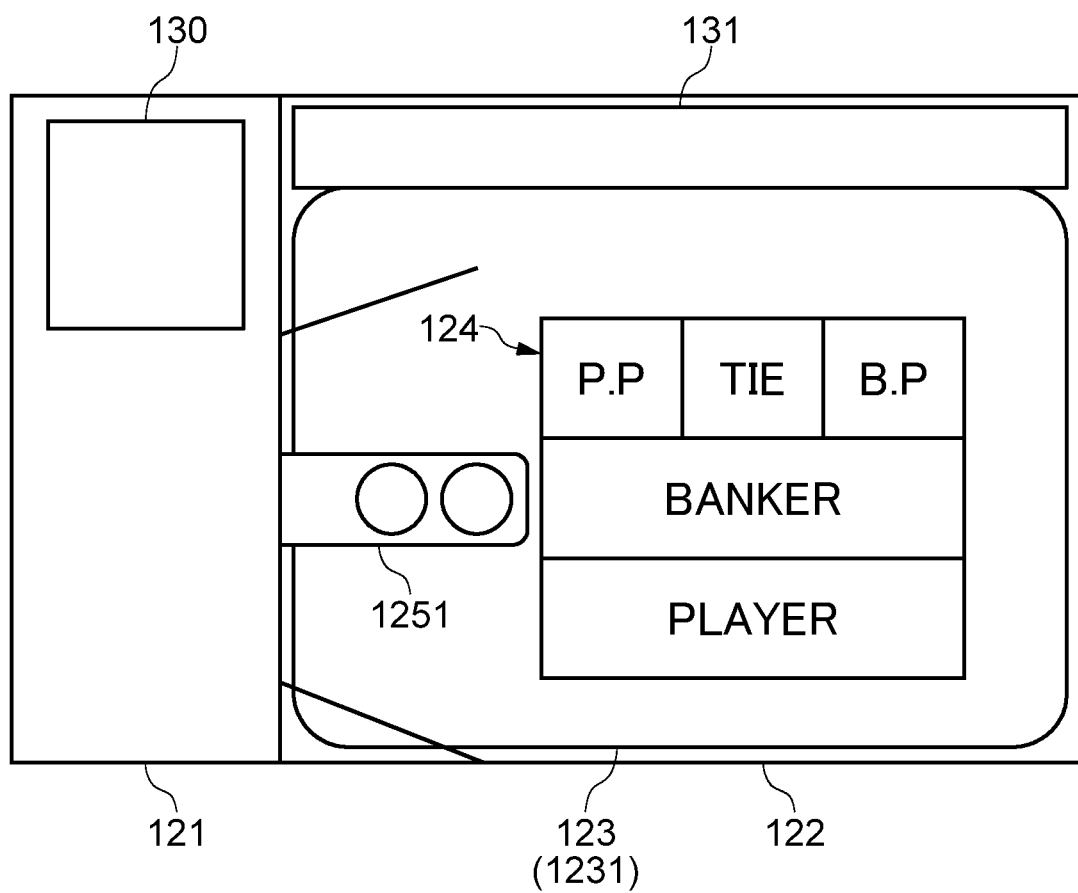
FIG. 9 shows a view of an example of the chip placing surface of the first embodiment of the present invention.

FIG. 9 shows a view of an example of the chip placing surface of the first embodiment of the present invention. When the betted gaming chips are chips for which payment should be performed, as shown in FIG. 9, a window 125 opens, and an arm 1251 carrying gaming chips C for payment extends out from the payment body 121 to the chip placing surface 123. At this time, gaming chips are paid out as the gaming chip C for payment, whose amount is the amount of the collected gaming chips C plus one time the amount of the gaming chips C betted on the player win and the banker win, eight times the amount of the gaming chips C betted on the tie, and eleven times the amount of the gaming chips C bet on the player pair and the banker pair in accordance with rules of the baccarat. In the state as shown in FIG. 9, settlement is completed.

When the settlement is completed, the cover member 128 is opened, and when there are gaming chips C to be paid-out, the player can take the paid-out gaming chips C. When the player takes the paid-out gaming chip C, the arm 1251 is accommodated in the payment body 121, and the window 125 closes, thereby allowing a bet for the next game.

Thus, in this embodiment, whether a player wins or loses a game, betted gaming chip C is collected, and when the player wins the game, gaming chips are paid out, whose amount is the amount of the betted gaming chips C plus the amount of gaming chips to be paid out. Alternatively, when the player wins the game, only the gaming chips to be paid out may be moved from the payment body 121 to the bet placement surface 123 without collecting the betted gaming chips C (without driving the belt conveyor 1231). This is more preferable because this is more similar to actual operations at the gaming table. However, in this case, it is assumed that the player does not bet on multiple bet targets.

In this embodiment, the belt conveyor 1231 corresponds to the collecting device 29 in FIG. 4. The arm 1251 corresponds to the payment device 32. These collecting device 29 and payment device 32 form a settlement device.

In this embodiment, the gaming chips C collected in the collecting box 132 as the collection accommodating portion by the collecting device 29 are transferred to the assorting device 31 by the transferring device 30, assorted by type (amount) by the assorting device 31, and then accommodated in a payment accommodating portion. The payment device 32 determines types and a number of gaming chips to be paid out based on a game result and positions, types and a number of betted gaming chips C, and move the gaming chips C to be paid out from the payment accommodating portion to the chip placing surface 123 by the arm 1251, as is mentioned above.

Thus, in this embodiment, the gaming chips C collected by the collecting device 29 are transferred by the transferring device 30, assorted by type by the assorting device 31, and paid out by the payment device 32. That is, the collected gaming chips C are circulated within the betting terminal 102 and paid out. In other embodiments, the collecting device 29 may only collect and the payment device 32 may pay out gaming chips that is previously accommodated in the payment accommodating portion. That is, configuration may be, in which gaming chips are not circulated from the collection accommodating portion to the payment accommodating portion.

The fraud detecting device 24 detects a fraud by detecting that the cover member 128 is forcibly moved in the gaming phase from finish of a bet to a decision of a game result and in the settlement phase in which collection of and payment for the gaming chips C is performed, i.e., when the cover member 128 covers the chip placing surface 123.

In addition, the fraud detecting device 24 judges that the fraud occurs when there is a variation in the gaming chips recognized by the image analyzing device for bet recognition 23 in the image imaged by the bet imaging camera 126 in the gaming phase and the settlement phase. Alternatively, the fraud detecting device 24 may judge that the fraud occurs when the image analyzing device for bet recognition 23 analyzes the image imaged by the bet imaging camera 126 to determine the player touches or tries to touch the betting chip in the gaming phase and the settlement phase.

Figure 10:
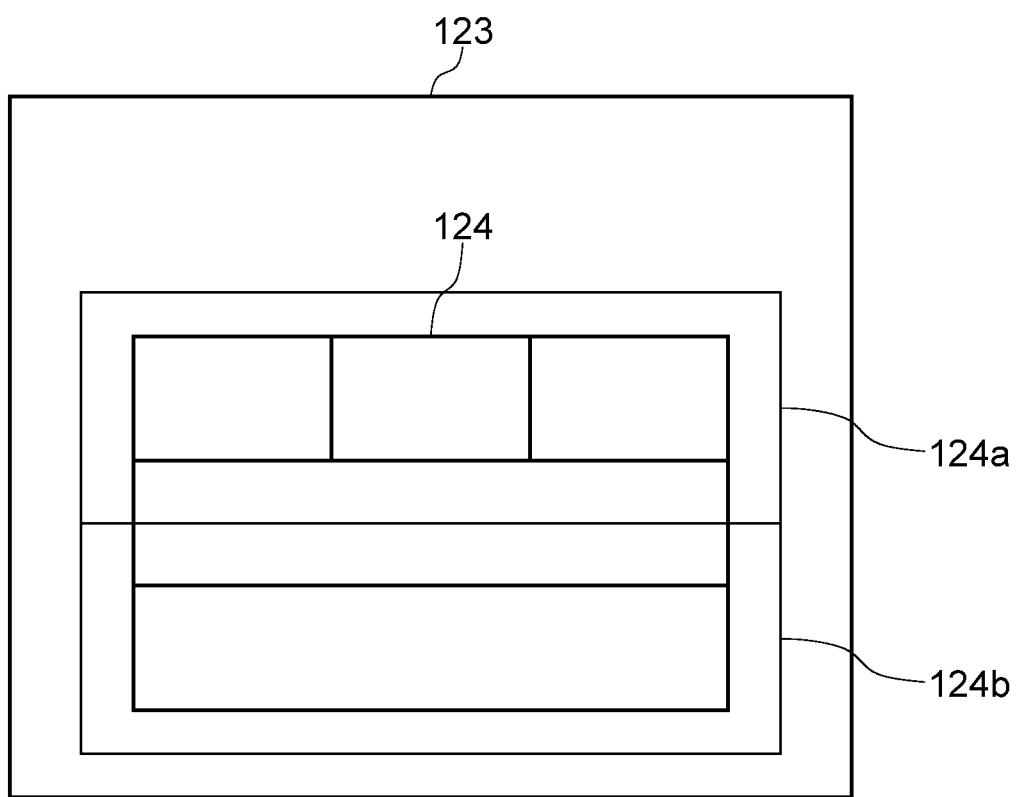
FIG. 10 shows a view of a chip placing surface of a second embodiment of the present invention.

FIG. 10 shows a view of a chip placing surface of a second embodiment of the present invention. In this embodiment, the bet area 124 is arranged within two adjacent movable floors 124a and 124b.

Figure 11:
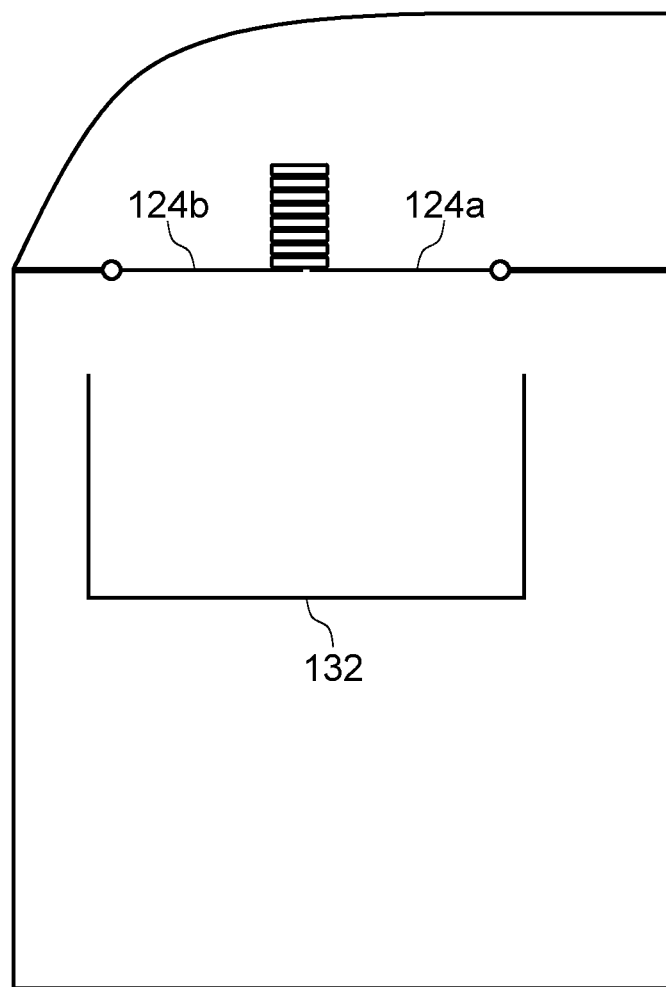
FIG. 11 shows a side cross-sectional view of a betting terminal of the second embodiment of the present invention.
Figure 12:
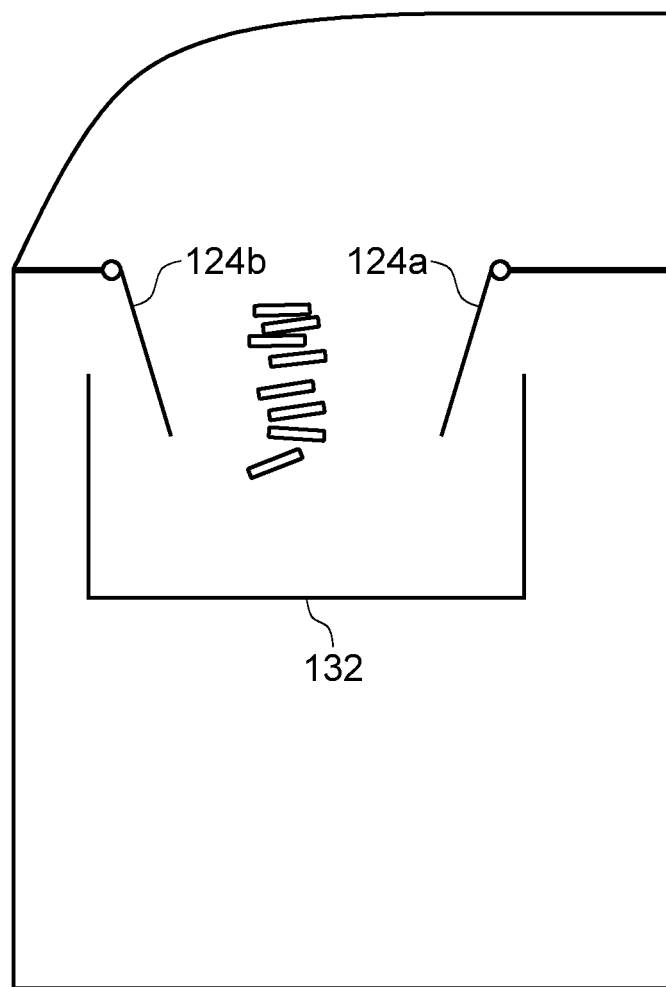
FIG. 12 shows a side cross-sectional view of the betting terminal of the second embodiment of the present invention.

FIGS. 11 and 12 show a side cross-sectional view of a betting terminal of the second embodiment. As shown in FIG. 11, when the movable floors 124a and 124 b are in a position parallel to the chip placing surface 123, a player can bet gaming chips C on the bet area 124. When collecting the betted gaming chips C, as shown in FIG. 12, the movable floors 124a and 124b open, and the betted chips C fall down and are collected in the collecting box 132.

Figure 13:
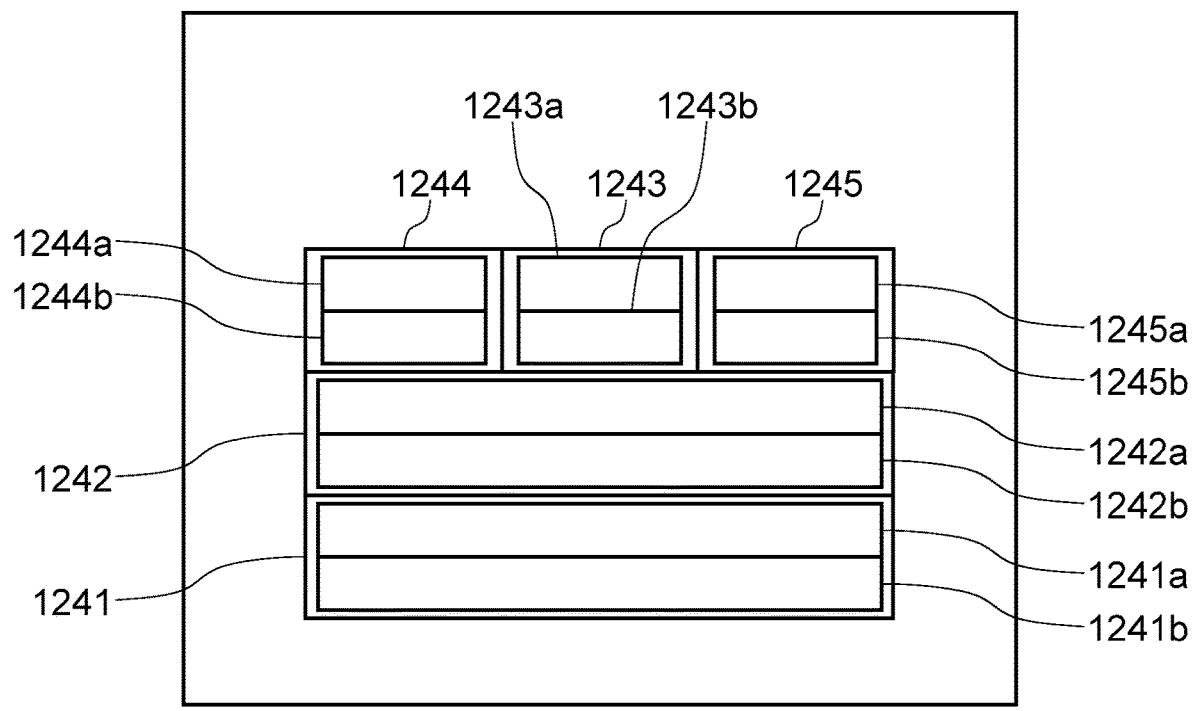
FIG. 13 shows a view of a chip placing surface of a third embodiment of the present invention.

FIG. 13 shows a view of a chip placing surface of a third embodiment of the present invention. In this embodiment, two adjacent movable floors are provided for each bet target in the bet area. That is, movable floors 1241a and 1241b are provided in the player win area 1241, movable floors 1242a and 12 42b are provided in the banker win area 1242, movable floors 1243a and 1243b are provided in the tie area 1243, movable floors 1244a and 1244b are provided in the player pair area 1244, and movable floors 1244a and 1244b are provided in the bunker pair area 1245.

Figure 14:
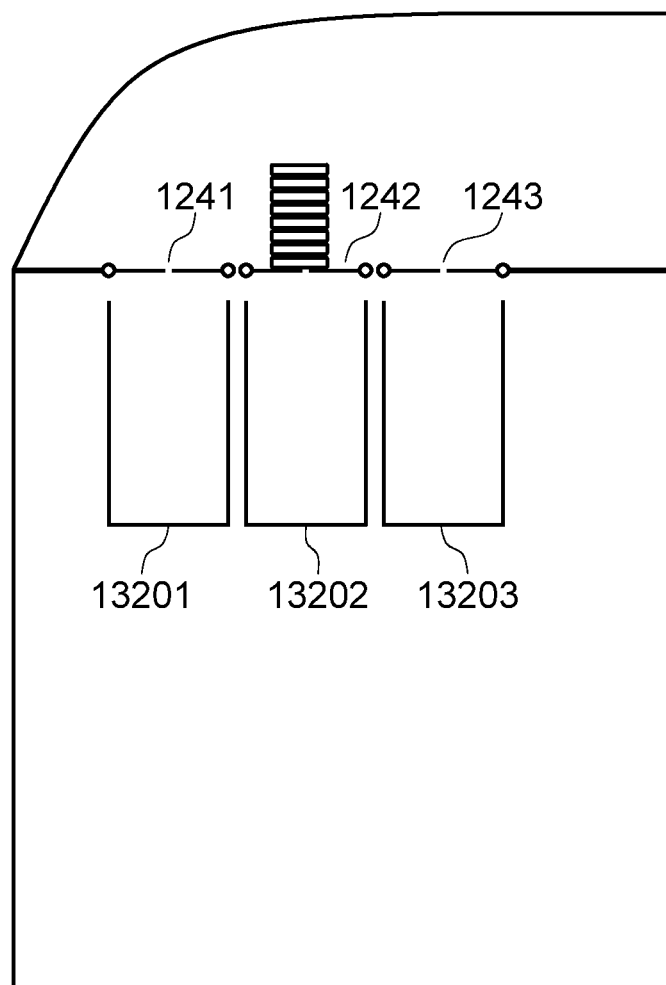
FIG. 14 shows a side cross-sectional view of a betting terminal of the third embodiment of the present invention.

FIG. 14 shows a side cross-sectional view of a bed terminal of the third embodiment. In this embodiment, the collecting box is provided for each bet target. That is, a collecting box 13201 is provided under the player win area 1241, a collecting box 13202 is provided under the banker win area 1242, and a collecting box 13203 is provided under the tie area 1243.

In this embodiment, betted chips that win a game can be left in place without collected. That is, when a player bets gaming chips C on multiple bet targets, it is possible that some of the betted chips is collected and a payment is performed for some of the betted chips depending on a game result. In this case, if it is impossible to collect only some of the betted gaming chips, as is in the first or second embodiment, all of the betted chips are collected once, and then, gaming chips C whose amount is equal to the amount of the betted gaming chips are also paid out together with gaming chips to be paid out.

However, this makes it difficult to understand which betted chips won and which betted chip lost. In contrast, in this embodiment, payment is performed while the losing betted chips are collected and the winning betted chips are left in place, so it is easy to understand for which betted chips the payment is performed.

Figure 15:
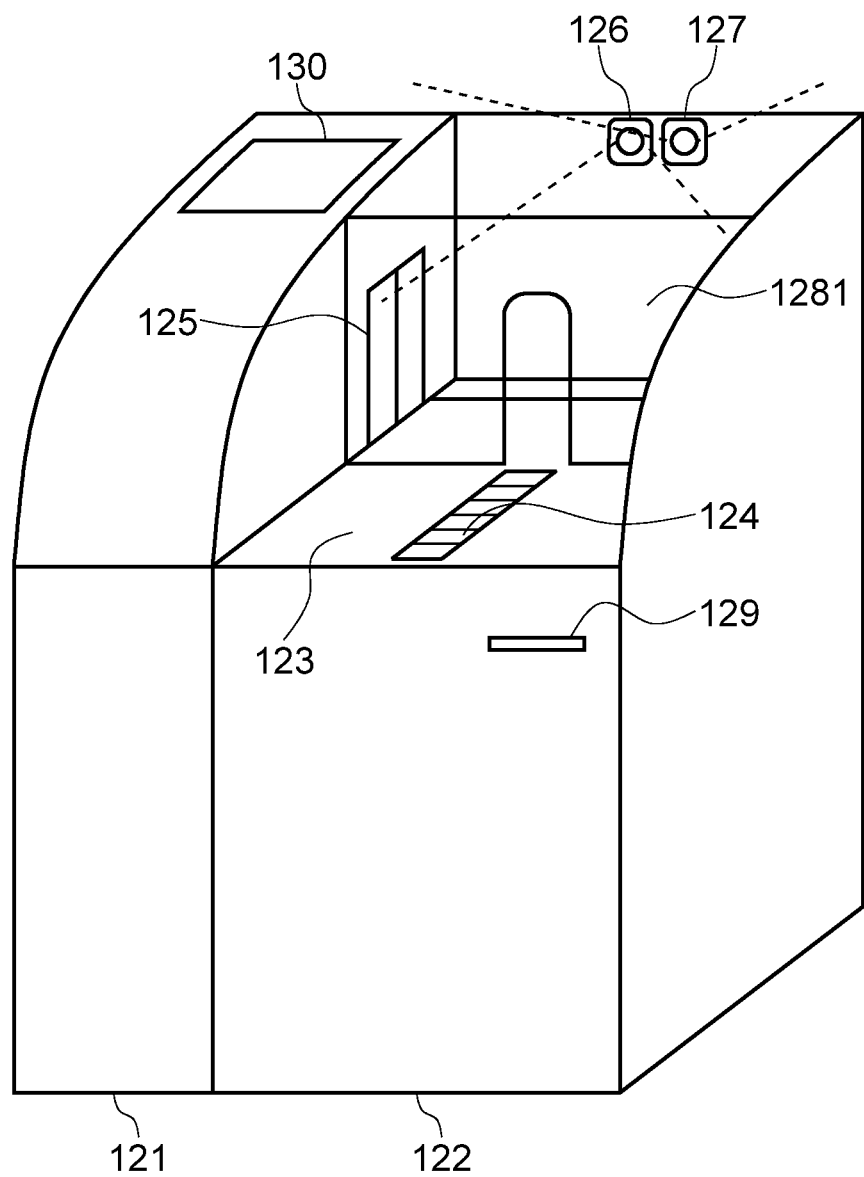
FIG. 15 shows an external view of a betting terminal of a fourth embodiment of the present invention.

FIG. 15 is an external view of a betting terminal of a fourth embodiment of the present invention. In this embodiment, the chip placing surface 123 is formed by the belt conveyor 1231, as is similar to the first embodiment. The back half of the belt conveyor 1231 is covered by a fixed transparent cover member 1281.

Figure 16:
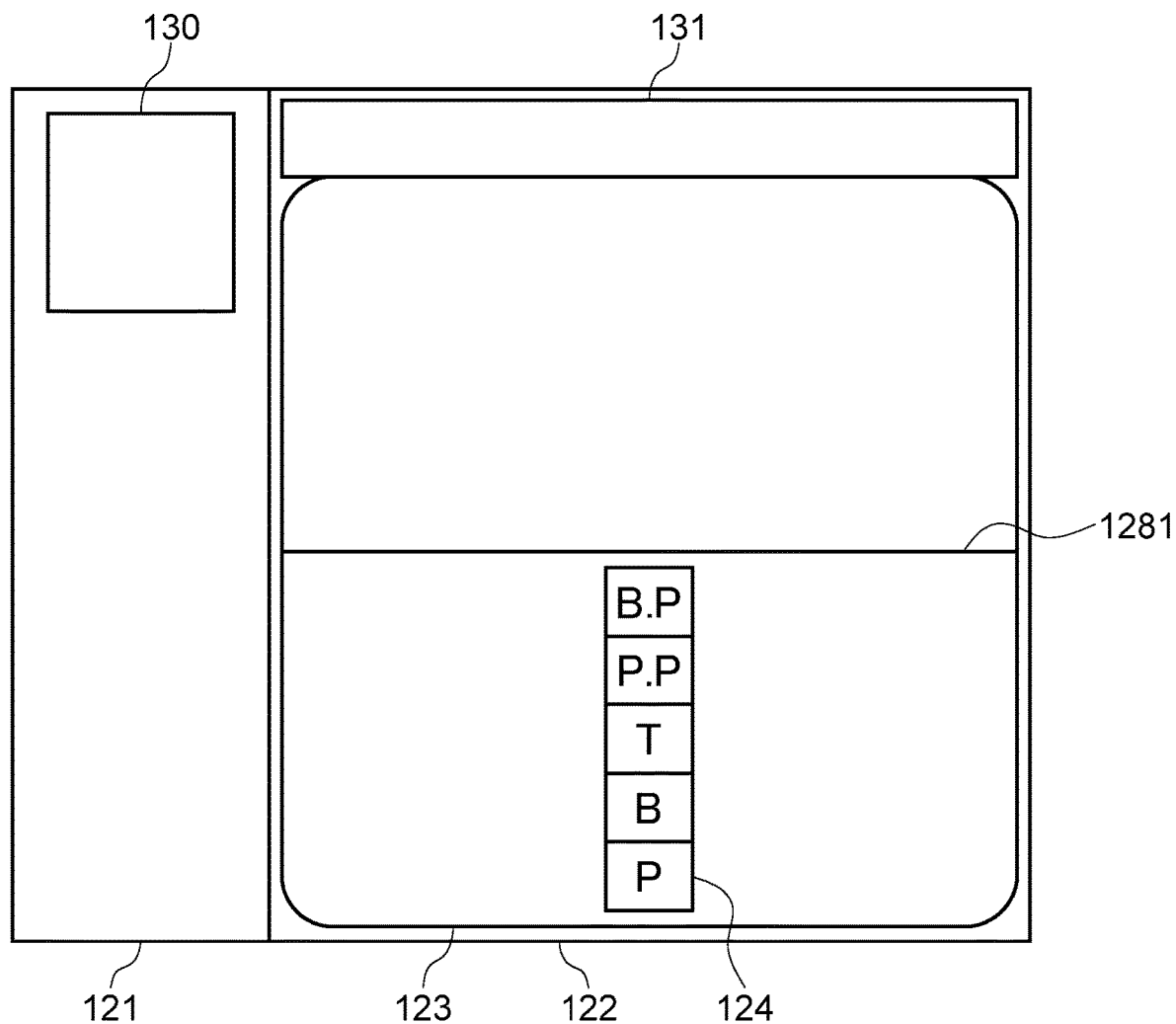
FIG. 16 shows a view of a chip placing surface of the fourth embodiment of the present invention.

FIG. 16 shows a view of the chip placing surface of the fourth embodiment of the present invention. In the chip placing surface 123, the bet area 124 extends in the longitudinal direction, and a plurality of bet targets is arranged in the longitudinal line. A gates 1281g is formed in the cover member 1281 corresponding to the bet area 124.

Figure 17:
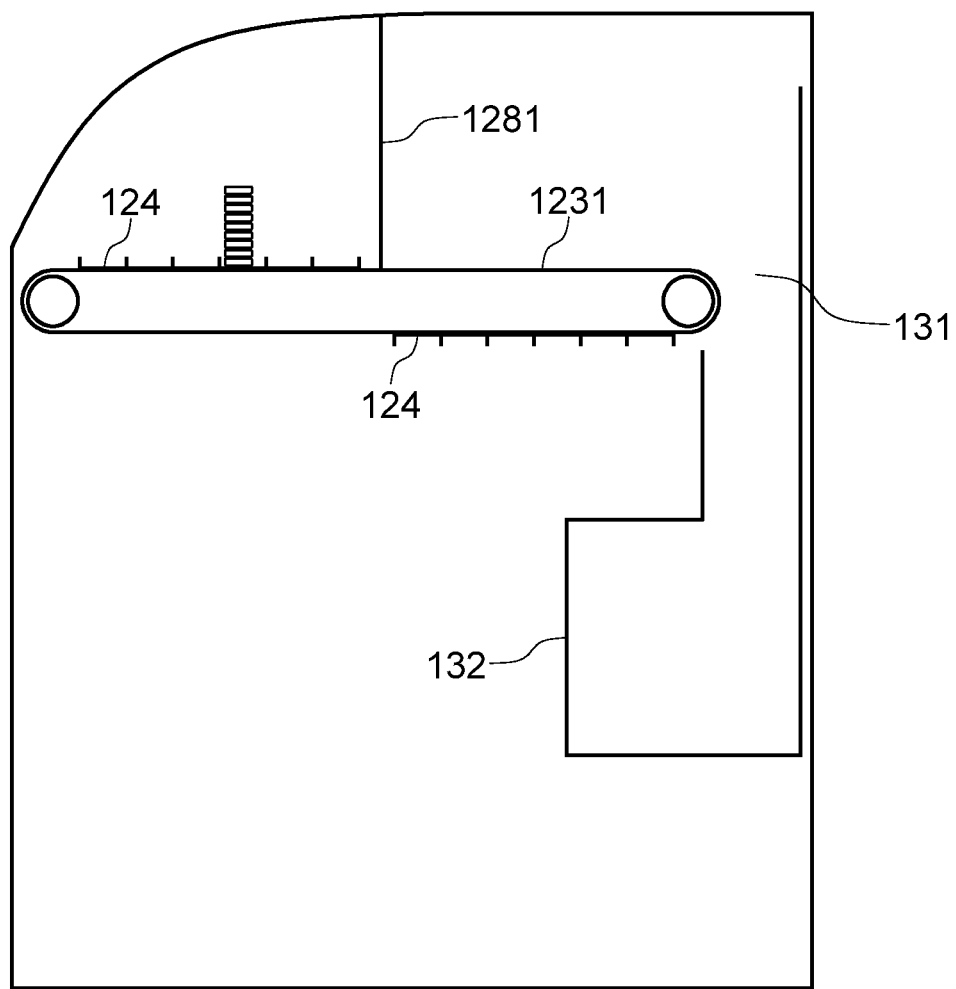
FIG. 17 shows a side cross-sectional view of the betting terminal of the fourth embodiment of the present invention.
Figure 18:
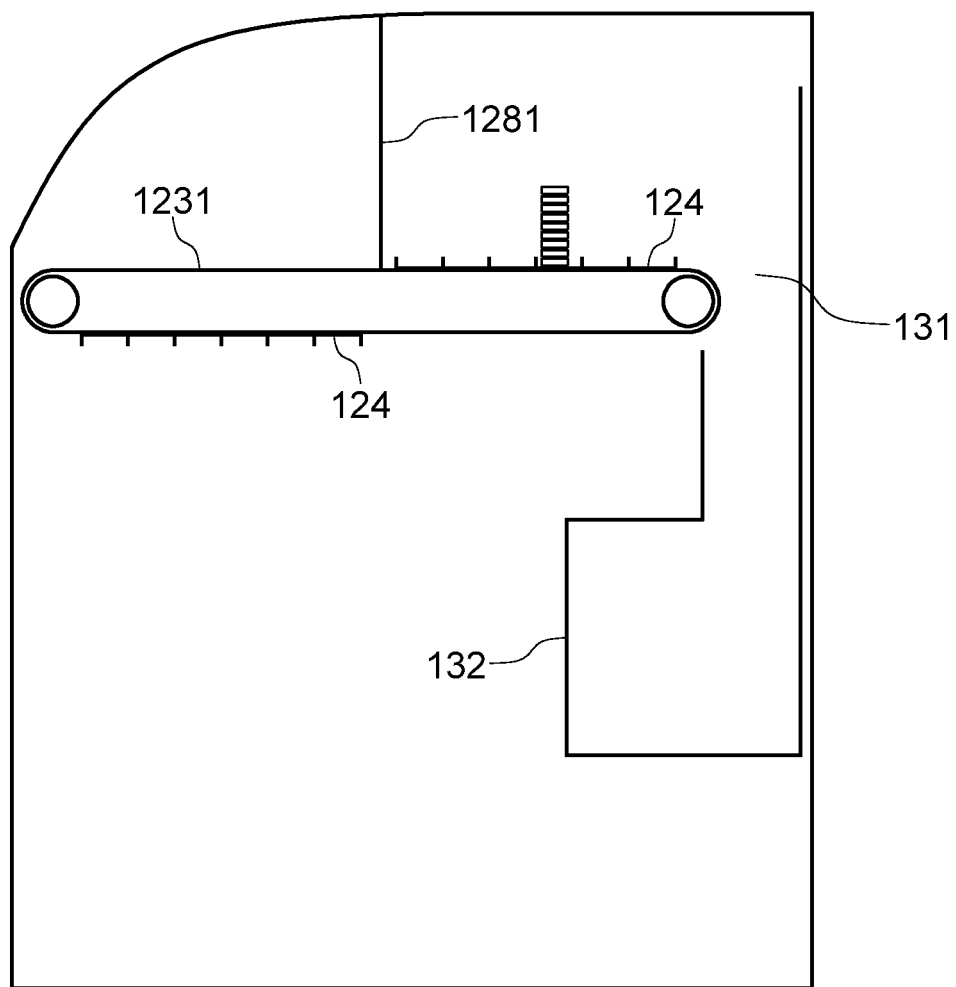
FIG. 18 shows a side cross-sectional view of the betting terminal of the fourth embodiment of the present invention.

FIGS. 17 and 18 show a side cross-sectional view of the betting terminal of the fourth embodiment of the present invention. When gaming chips C are bet on the bet area 124, the belt conveyor 1231 turns about ¼ cycle and moves to the back side of the cover member 1281, and the gaming chips C also moves to the back side of the cover member 1281. At this time, the gaming chips C stacked in the bet area 124 pass through the gate 128 and move to the back side of the cover member 1281.

In this embodiment, since the cover member 1281 is fixed and does not open and close, there is no risk of fault, and there is no risk of a player's hand being caught by the movable cover member.

Figure 19:
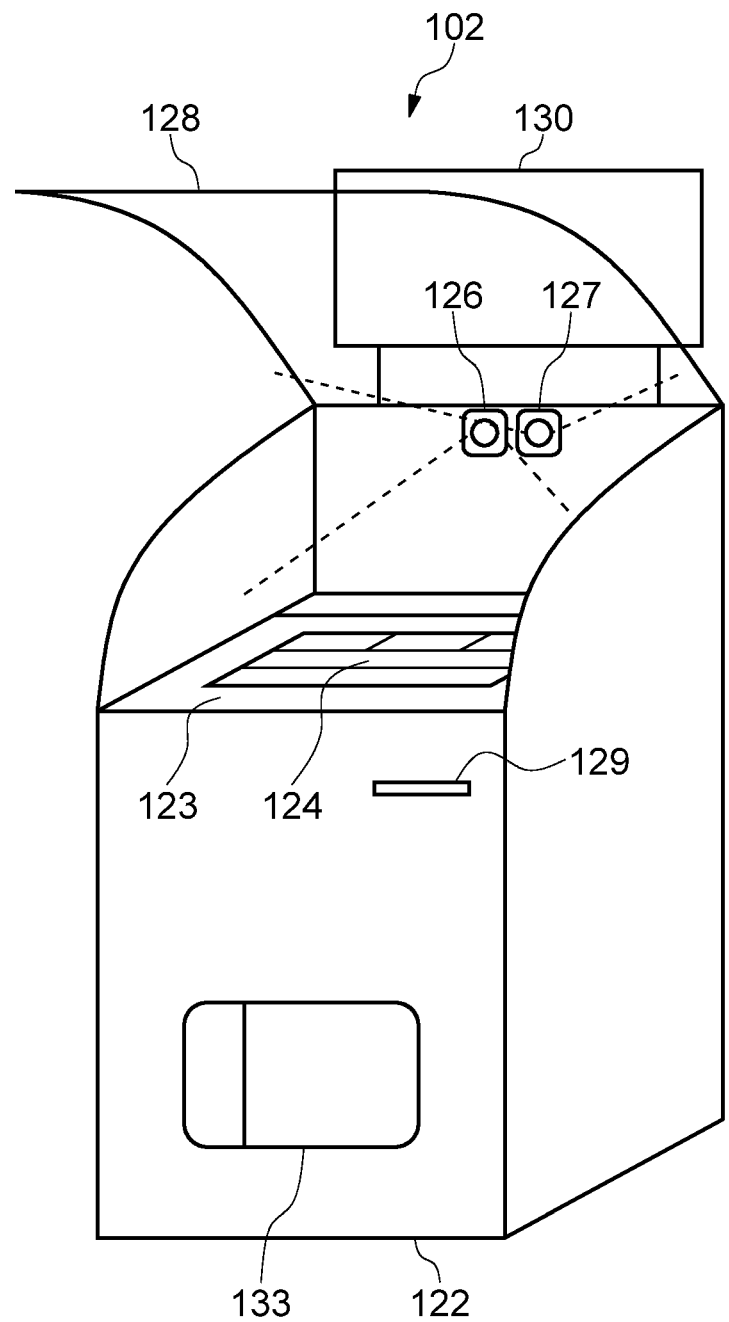
FIG. 19 shows an external view of a betting terminal of a fifth embodiment of the present invention.

FIG. 19 shows an external view of a betting terminal of the fifth embodiment of the present invention. In this embodiment, gaming chips C to be paid out are paid out from a payment opening 133 at the lower portion. In this embodiment, the monitor 130 is provided at the front.

Figure 20:
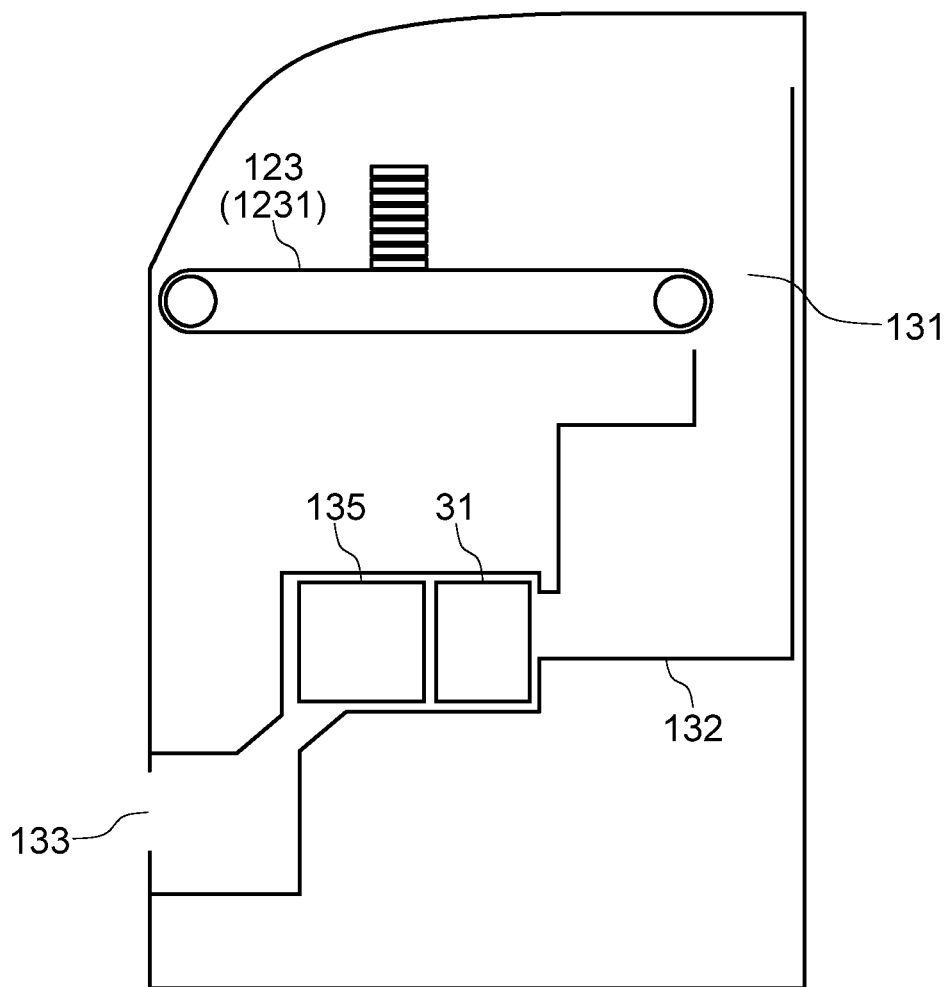
FIG. 20 shows a side cross-sectional view of the betting terminal of the fifth embodiment of the present invention.

FIG. 20 shows a side cross-sectional view of a betting terminal of a fifth embodiment of the present invention. In this embodiment, as is similar to the first embodiment, the chip placing surface 123 is formed by the belt conveyor 1231. Gaming chips C collected in the collecting box 132 from the collecting opening 131 by the rotation of the belt conveyor 1231 are assorted by type by the assorting device 31, and accommodated separately by type in a payment accommodating portion 135.

When paying out for winning betted chip, required types and a number of betted chips are ejected from the payment accommodating portion 135 to allow to take out the gaming chips from the payment opening 133. As is similar to the first embodiment, the collected betted chips are also paid out at the payment.

Figure 21:
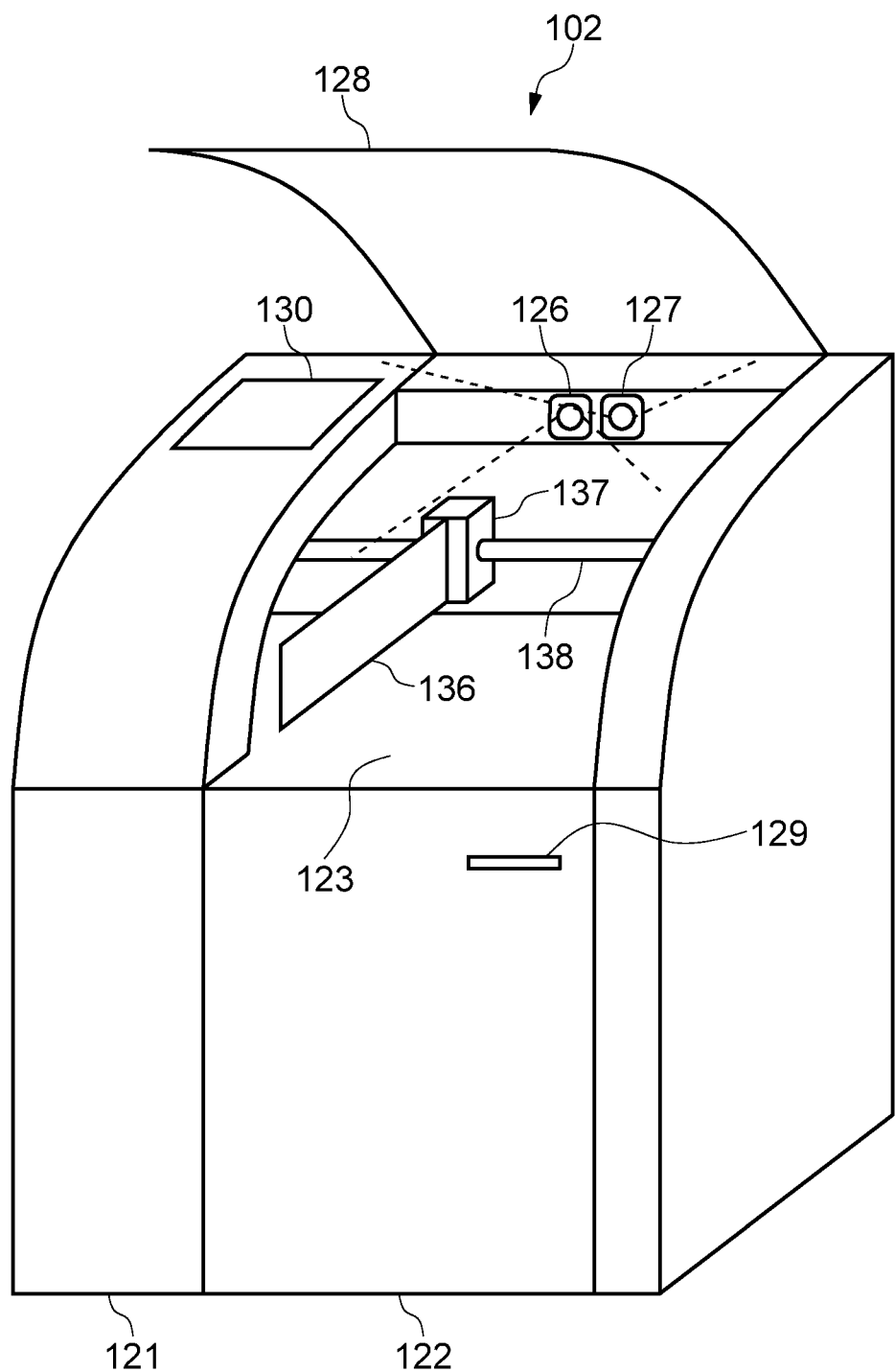
FIG. 21 shows an external view of a betting terminal of a sixth embodiment of the present invention.

FIG. 21 is an external view of a betting terminal of a sixth embodiment of the present invention. In the betting terminal 102 of this embodiment, collection and payment of gaming chips C are performed by a push-out paddle 136.

Figure 22:
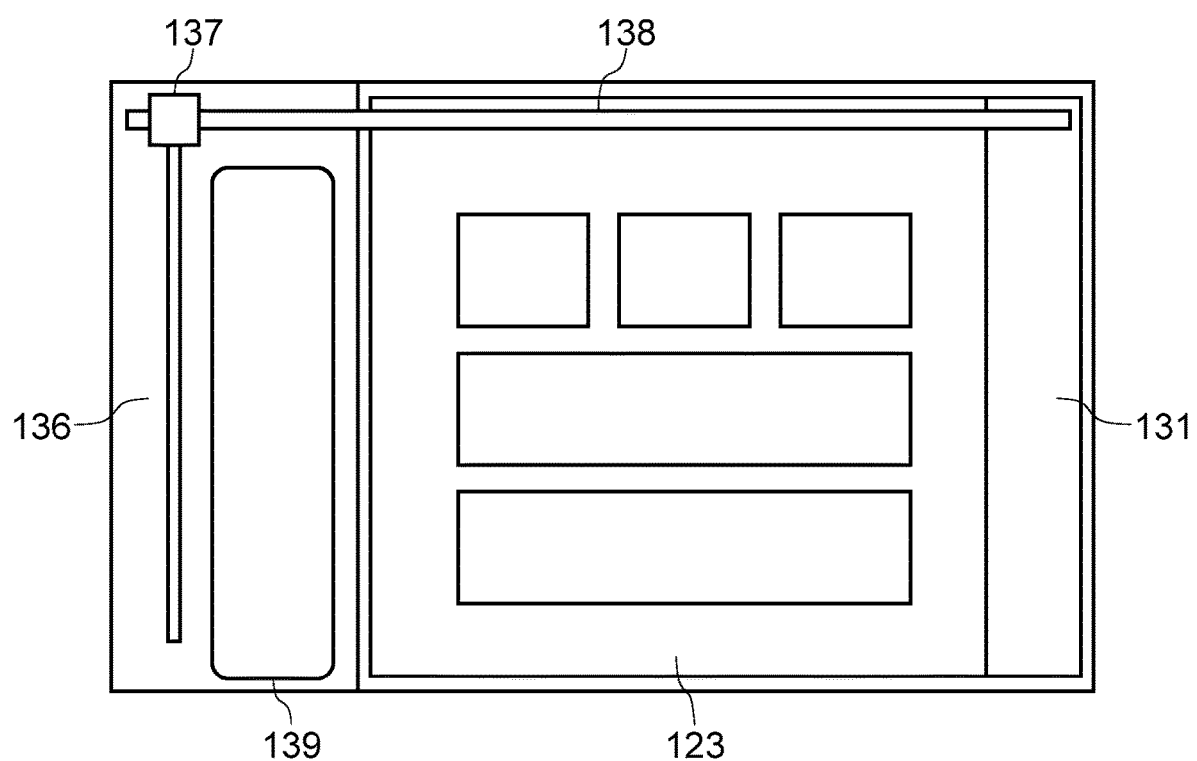
FIG. 22 shows a view of a chip placing surface of the sixth embodiment of the present invention.

FIGS. 22 to 26 show views of a chip placing surface of the sixth embodiment of the present invention. As shown in FIG. 22, the push-out paddle 136 extends from the back to the forward and is movable in the left and right direction. The push-out paddle 136 is held by a slider 137 arranged at the back. The slider 137 is movable along a rail 138, which are arranged on the back side and extends in the left and right direction. The payment accommodating portion is arranged on the left side of the betting terminal 102, and the collecting opening 131 is arranged on the right side of the betting terminal 102. The chip placing surface 123 is formed flat such that gaming chips C can easily slide on it, and is formed of a material with low resistance against the gaming chips C (such that the gaming chips C can easily slide on it).

Figure 23:
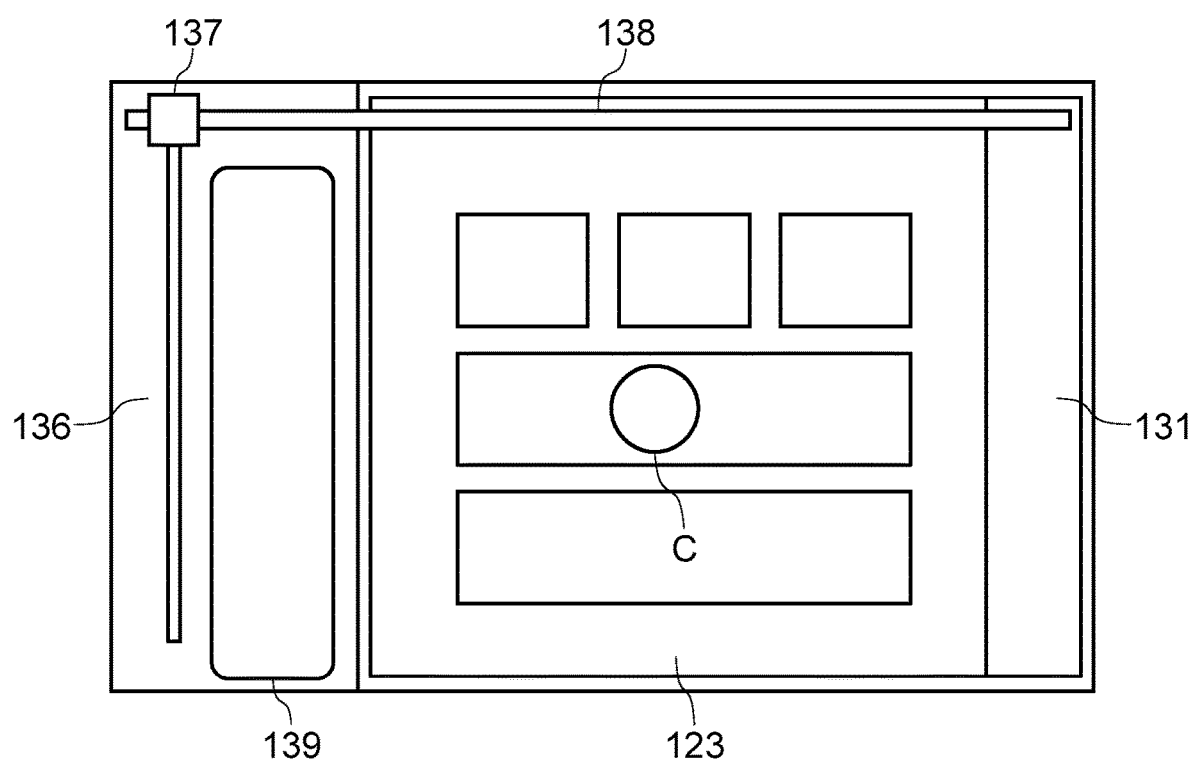
FIG. 23 shows a view of the chip placing surface of the sixth embodiment of the present invention.
Figure 24:
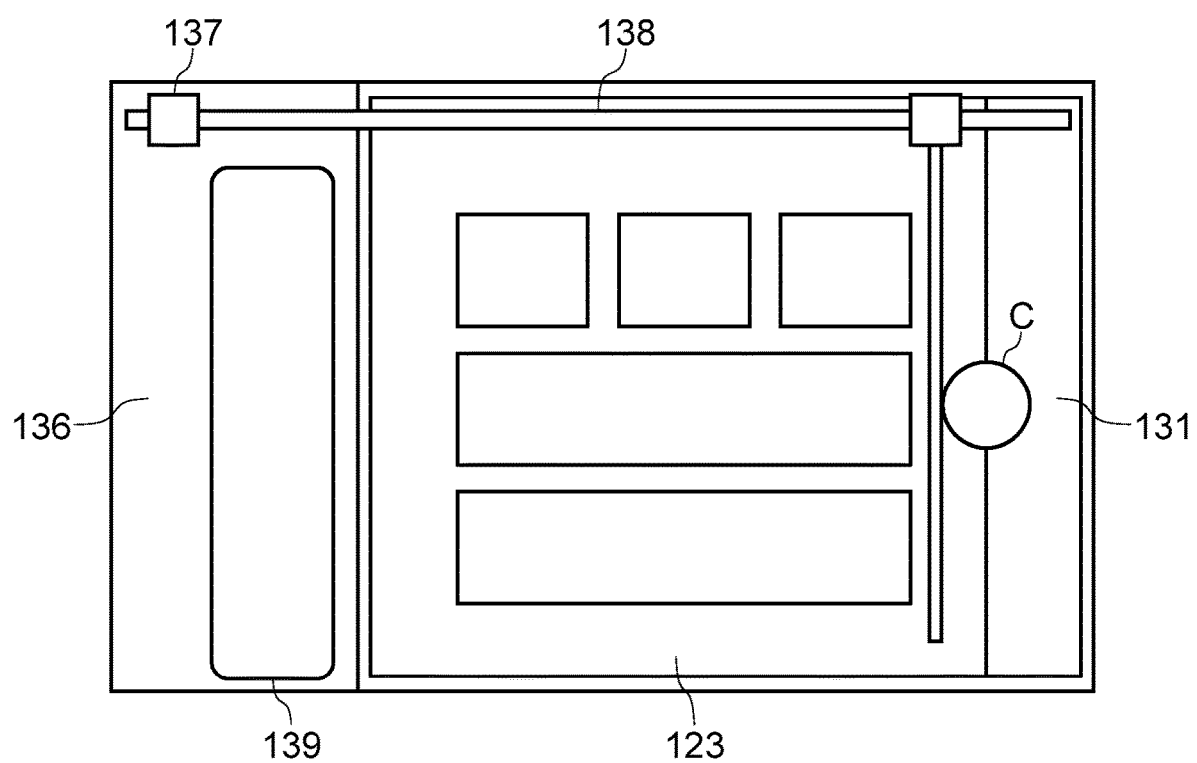
FIG. 24 shows a view of the chip placing surface of the sixth embodiment of the present invention.
Figure 25:
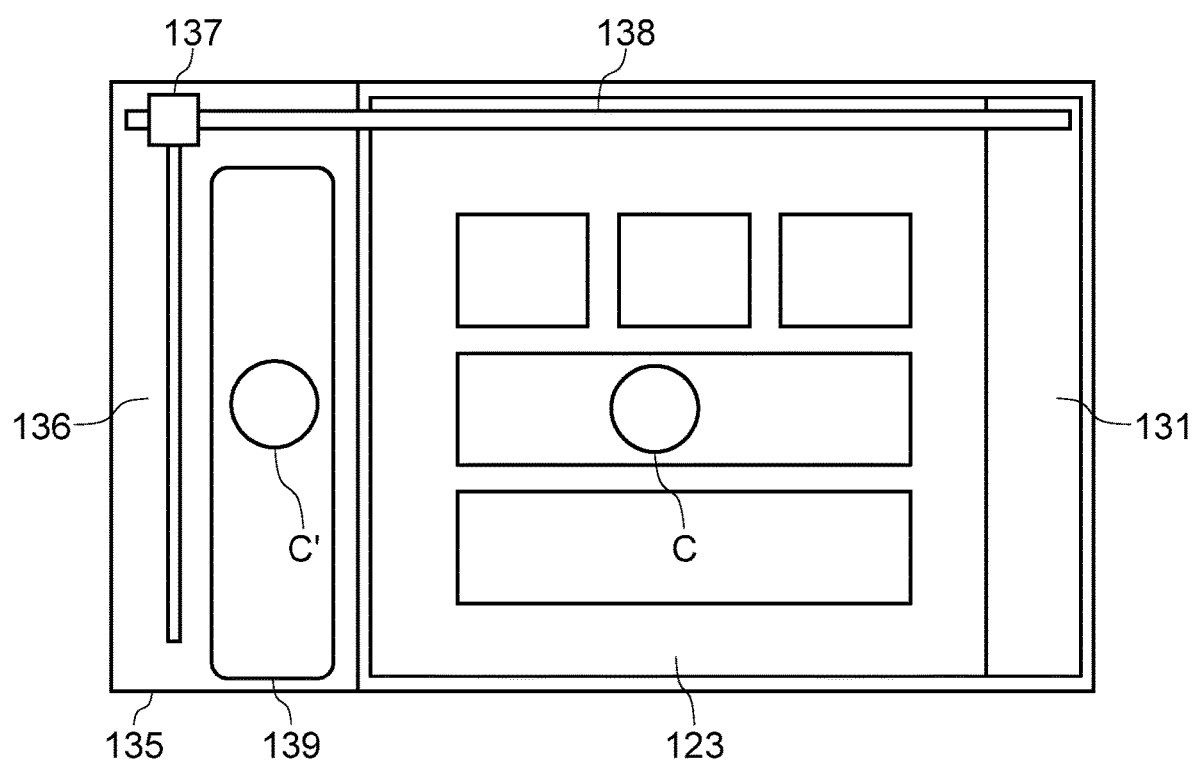
FIG. 25 shows a view of the chip placing surface of the sixth embodiment of the present invention.
Figure 26:
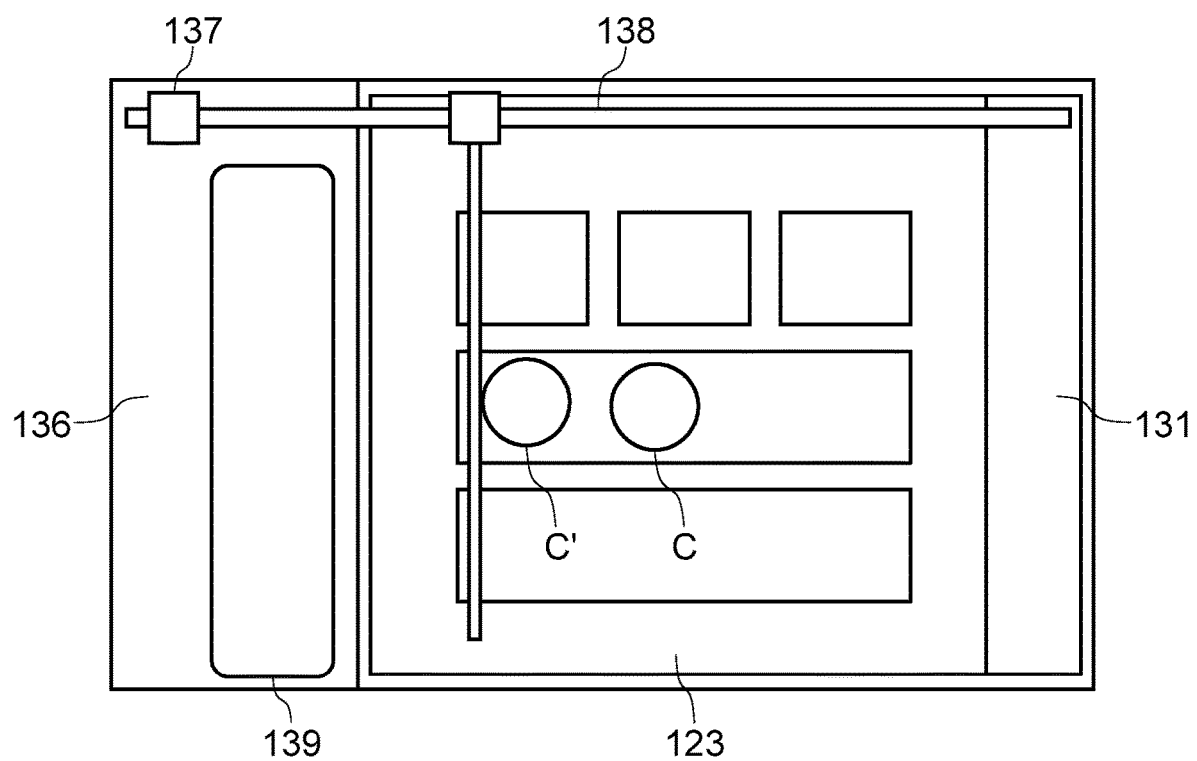
FIG. 26 shows a view of the chip placing surface of the sixth embodiment of the present invention.

FIGS. 23 to 24 show an operation in which losing betted chips are collected, and FIGS. 25 to 26 show an operation in which payment is performed for winning betted chips. As shown in FIG. 23, when gaming chips C is bet on the banker win area and those betted chips lose the game (i.e., the banker hand does not win), those betted chips are collected. At this time, the push-out paddle 136 moves from the payment housing 135 side to the collecting opening 131, and as shown in FIG. 24, pushes the betted chips out to the collecting opening 131 and causes them to fall into the collecting opening 131.

When the betted chips win (i.e., the banker hand wins), gaming chips are paid out for those betted chips. At this time, as shown in FIG. 25, gaming chips C' to be paid out are transferred to the payment accommodating portion 135 by a belt conveyor 139, and as shown in FIG. 26, this gaming chips C' to be paid out are pushed out to the side of the gaming chips C.

In this embodiment, when the betted chips win, it is not necessary to collect those betted chips, and it is possible to pay out the gaming chip C' to the side of the betted chips C, as is similar to performed in the game table.

Figure 27:
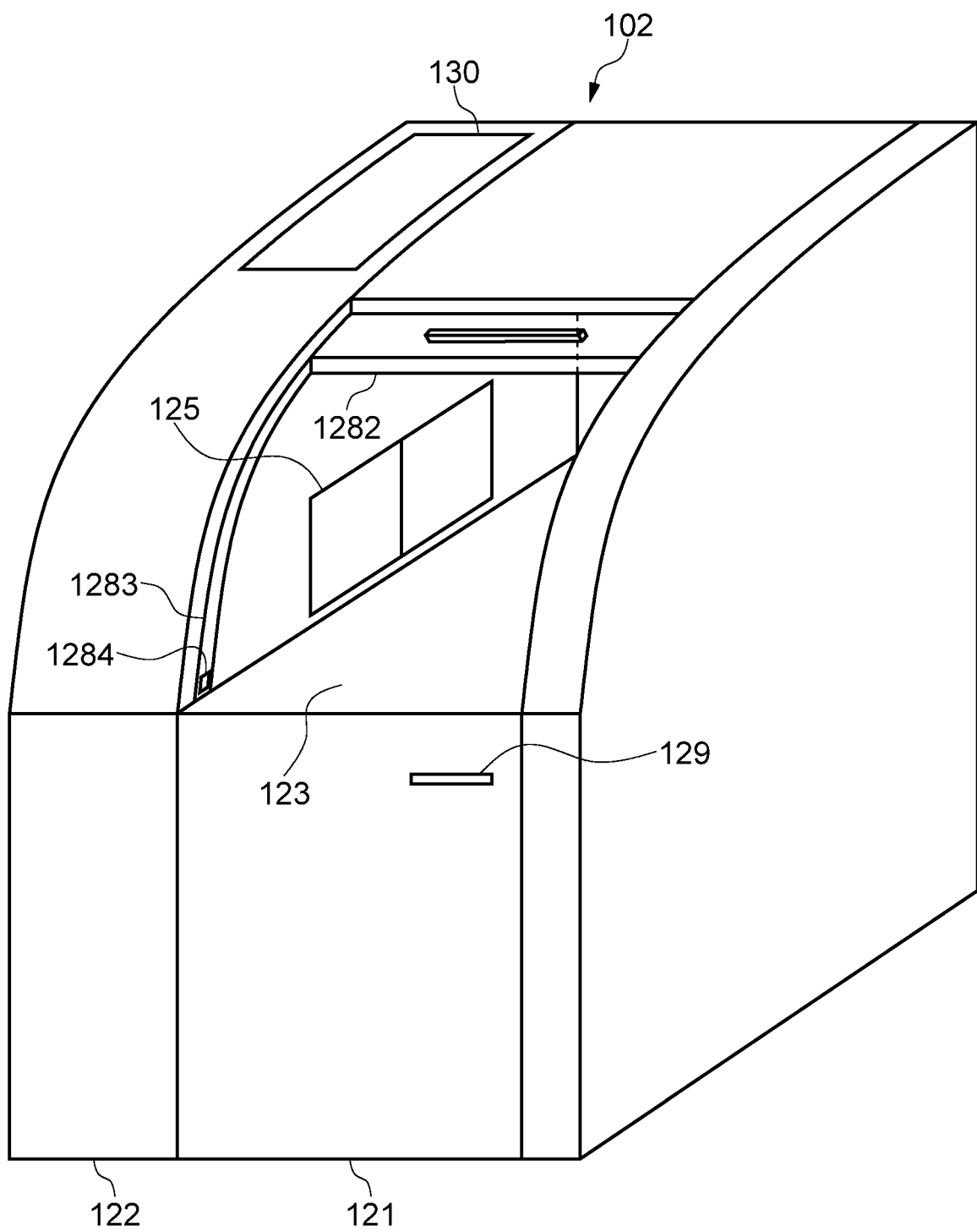
FIG. 27 shows an external view of a betting terminal of a seventh embodiment of the present invention.
Figure 28:
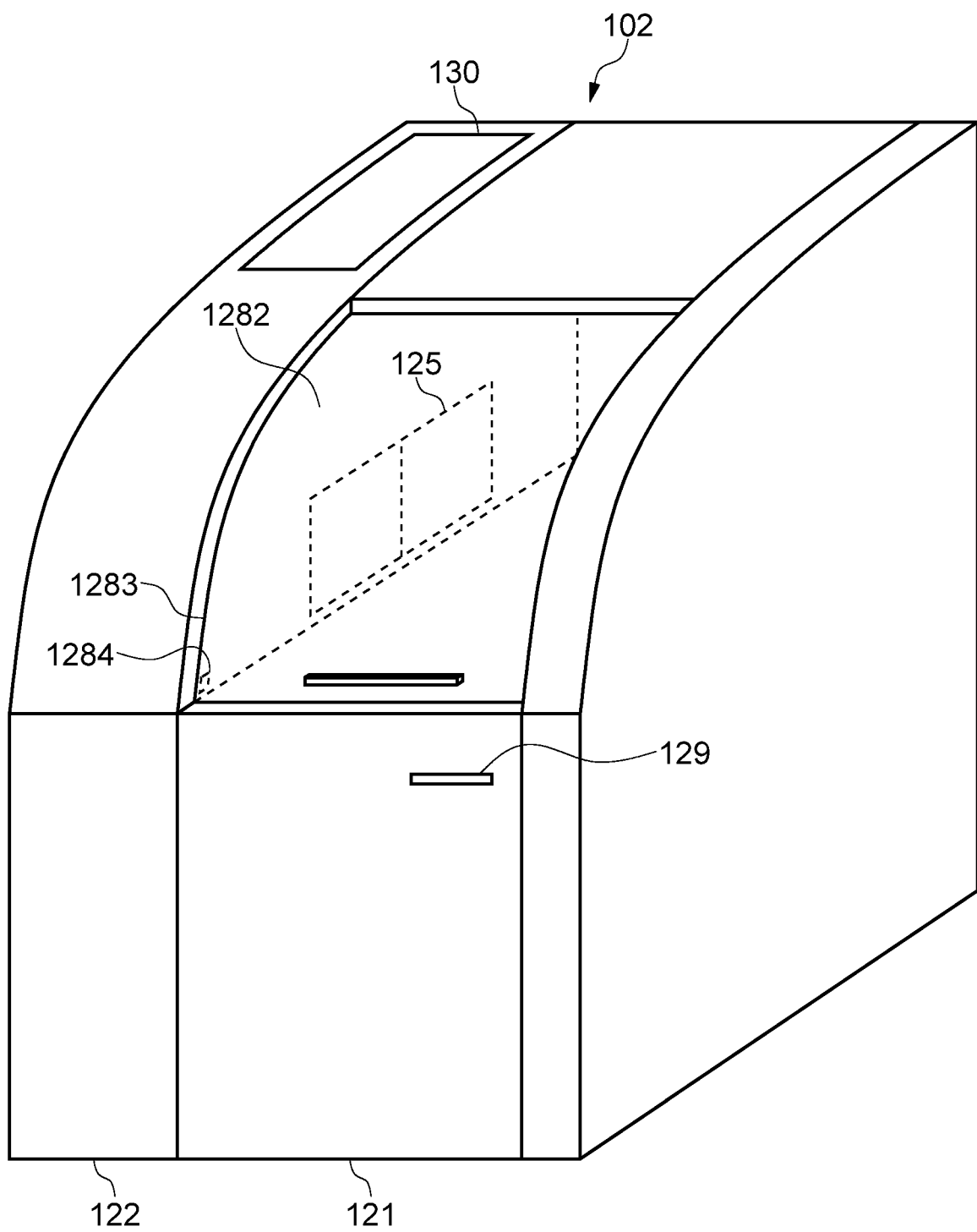
FIG. 28 shows an external view of the betting terminal of the seventh embodiment of the present invention.

FIGS. 27 and 28 show an external view of a betting terminal of a seventh embodiment of the present invention. In this embodiment, a cover member 1282 is a sliding type. The cover member 1282 is made of a transparent member, as is similar to the first embodiment. When a player bets, the player manually opens the cover member 1282 as shown in FIG. 27 and bet on the chip placing surface 123, and when the player finishes the bet, the player manually closes the cover member 1282, as shown in FIG. 28.

The cover member 1282 is movable along a rail 1283. A sensor 1284 is provided at the end portion of the rail 1283. The sensor 1284 detected that the cover member 1282 is completely closed as shown in FIG. 28. The output of the sensor is input to the fraud detecting device 24 (see FIG. 4) and is used to detect a fraud. That is, when the sensor 1284 detects that the cover member 1282 is not closed in the gaming and clearing phase, the fraud detecting device 24 judges that the fraud occurs.

For the opening and closing action of the cover member 1282 by a player, countdown of remaining time of the betting phase may be displayed on the monitor 130. The player must manually close the cover member 1282 as shown in FIG. 28 before the betting phase finishes. When the cover member 1282 is closed in the betting phase and the betting phase is finished, the cover member 1282 may be locked by a locking mechanism not shown such that the cover member 1 282 cannot be opened. This lock is released at a timing when the settlement phase is finished.

In this embodiment, since the player opens and closes the cover member 1282 by self, there is no worry that fingers are pinched by the cover member 128. In addition, the locking the cover member 1282 in the closed position by the locking mechanism as described above can prevent a pinching, a capping and other frauds to be performed.

Figure 29:
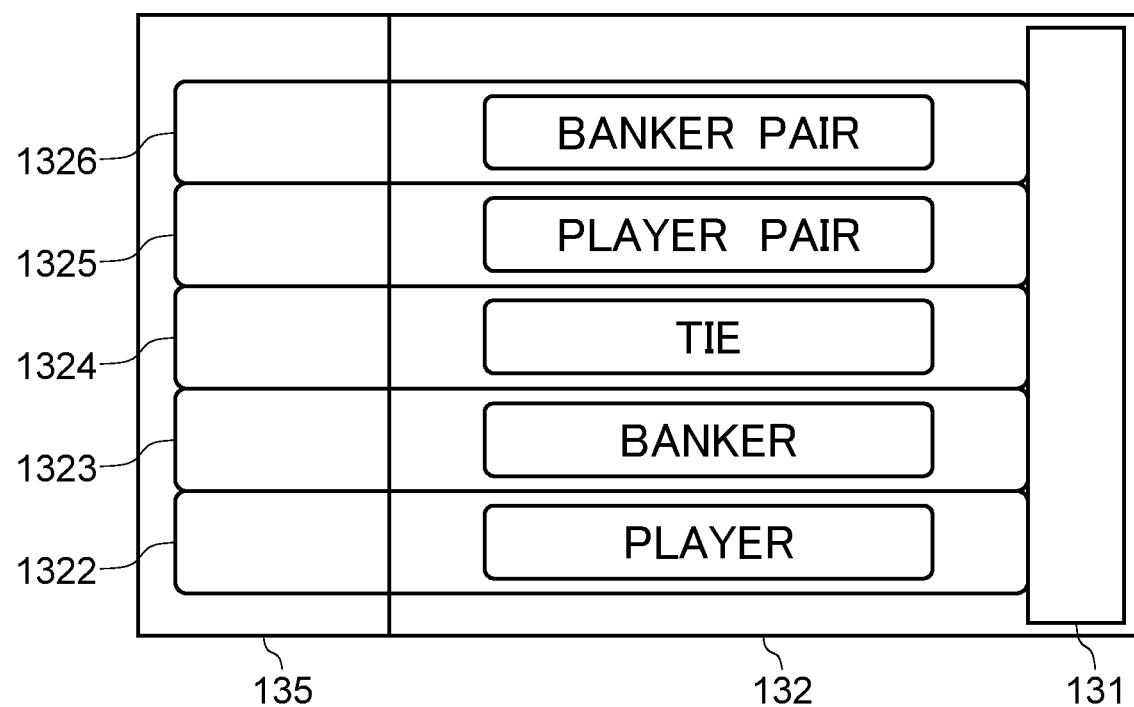
FIG. 29 shows a view of a chip placing surface of an eighth embodiment of the present invention.

FIG. 29 shows a view of a chip placing surface of an eighth embodiment of the present invention. In this embodiment, a belt conveyor is provided for each bet target in the bet areas 124. The plurality of bet targets is arranged in the longitudinal direction, and each belt conveyor is movable laterally. The collecting opening 131 is provided on the judgment side (right side) of the payment accommodating portion 135.

Each belt conveyor extends from the payment accommodating portion 135 to the collecting opening 131. A belt conveyor 1322 is provided corresponding to the player win area, a belt conveyor 1323 is provided corresponding to the banker win area, a belt conveyor 1324 is provided corresponding to the tie area, a belt conveyor 1325 is provided corresponding to the banker pair area, and a belt conveyor 1326 is provided corresponding to the tie area.

In the settlement phase, once all betted chips C are collected, and for winning betted chip, gaming chips C to be paid out and gaming chips C whose amount is the same amount as the betted gaming chips are transferred from the payment accommodating portion 135 to the chip placing surface 123 by the belt conveyor corresponding to the bet target.

Figure 30:
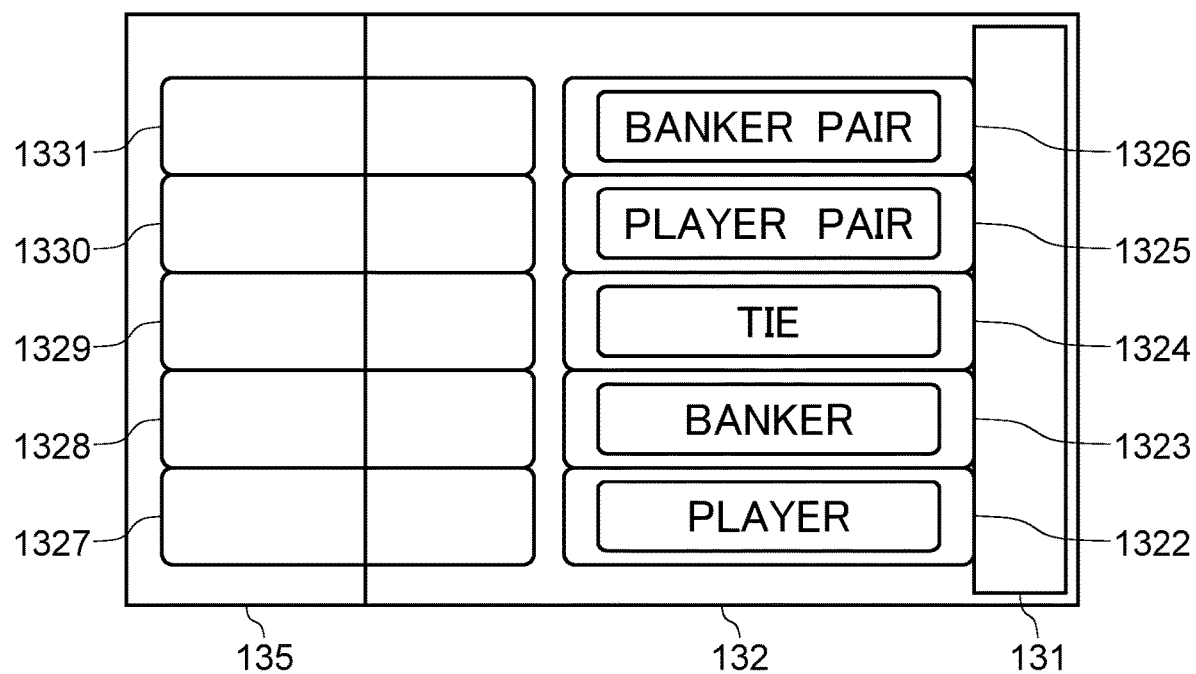
FIG. 30 shows a view of a chip placing surface of a ninth embodiment of the present invention.

FIG. 30 shows a view of a chip placing surface of a ninth embodiment of the present invention. In this embodiment, a collecting belt conveyor and a payment belt conveyor are provided for each bet target in the bet area 124. A plurality of bet targets is arranged in the longitudinal direction, and each belt conveyor is provided to be movable in the lateral direction.

Each collecting belt conveyor extends from the center of the chip placing surface 123 to the payment accommodating portion 131 on the left side, and each payment belt conveyor extends from the payment accommodating portion 135 to near the left end of the belt conveyor for collection. A collecting belt conveyor 1322 and a payment belt conveyor 1327 are provided corresponding to the player win area, a collecting belt conveyor 1323 and a payment belt conveyor 1328 are provided corresponding to the banker win area, a collecting belt conveyor 1324 and a payment belt conveyor 1329 are provided corresponding to the tie area, a collecting belt conveyor 1325 and a payment belt conveyor 1330 are provided corresponding to the player pair area, and a collecting belt conveyor 1326 and a payment belt conveyor 1331 are provided corresponding to the banker pair area.

In this embodiment, losing betted chips are transferred and collected to the collecting opening 131 by the collecting belt conveyor. Winning betted chips are left in place, and gaming chips to be paid out are transferred from the payment accommodating portion 135 to the chip placing surface 123 by the payment belt conveyor.

In this embodiment, since a collection and a payment can be performed for each bet target and there is no need to collect the winning betted chip once, the settlement can be performed in the similar manner to normal operations on the game table. For example, when a player bets on the player win and the player pair in a game and the player hand win but not the pair, the gaming chips bet on the player pair are collected, the chips betted on the player win are left in place, and gaming chips are paid out for the gaming chips betted on the player win.

In this embodiment, even when gaming chips are betted on multiple bet targets at the same time, the similar settlement operation to the normal settlement operation at the game table can be performed.

Figure 31:
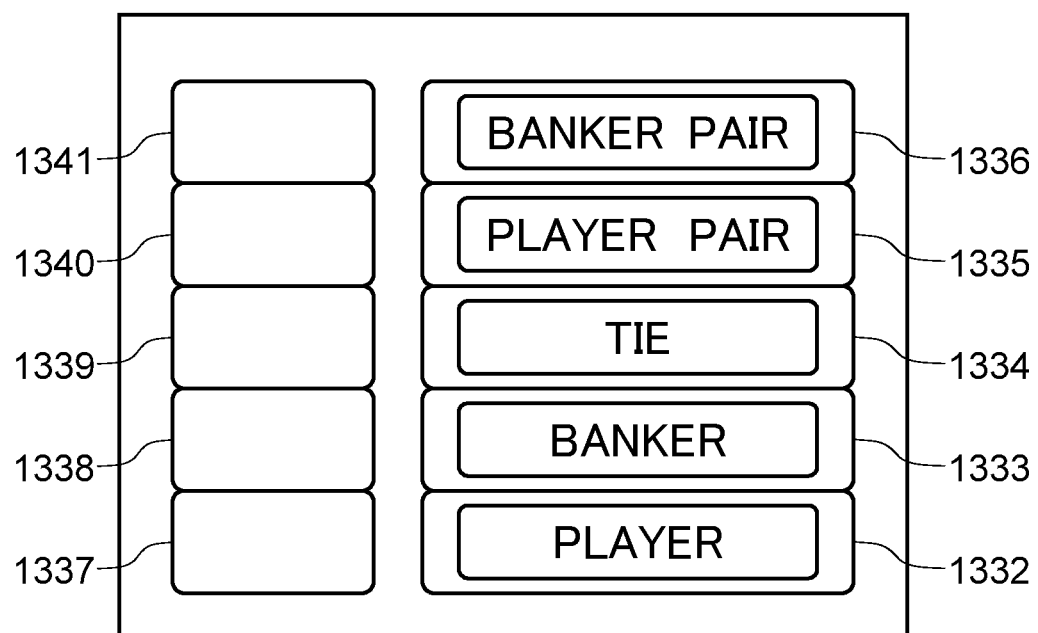
FIG. 31 shows a view of a chip placing surface of a tenth embodiment of the present invention.

FIG. 31 shows a view of a chip placing surface of a tenth embodiment of the present invention. In this embodiment, each bet target in the bet area 124 is formed by a collecting elevator that raises and descends individually, and a payment elevator is provided corresponding to each collecting elevator. That is, a collecting elevator 1332 and a payment elevator 1337 are provided corresponding to the player win area, a collecting elevator 1333 and a payment elevator 1338 are provided corresponding to the bunker win area, a collecting elevator 1334 and a payment elevator 1339 are provided corresponding to the tie area, a collecting elevator 1335 and a payment elevator 1340 are provided corresponding to the player pair area, and a collecting elevator 1336 and a payment elevator 1341 are provided corresponding to the banker pair area.

In this embodiment, the collecting elevator corresponding to losing betted chips descend, and the betted chips are collected inside the betting terminal 102. Winning betted chips remain in place in the bet area, and the payment elevator corresponding to the winning betted chips descends, carries gaming chips C to be paid out, and rises again. Thereby, the gaming chips to be paid out are placed on the chip placing surface 123.

Figure 32:
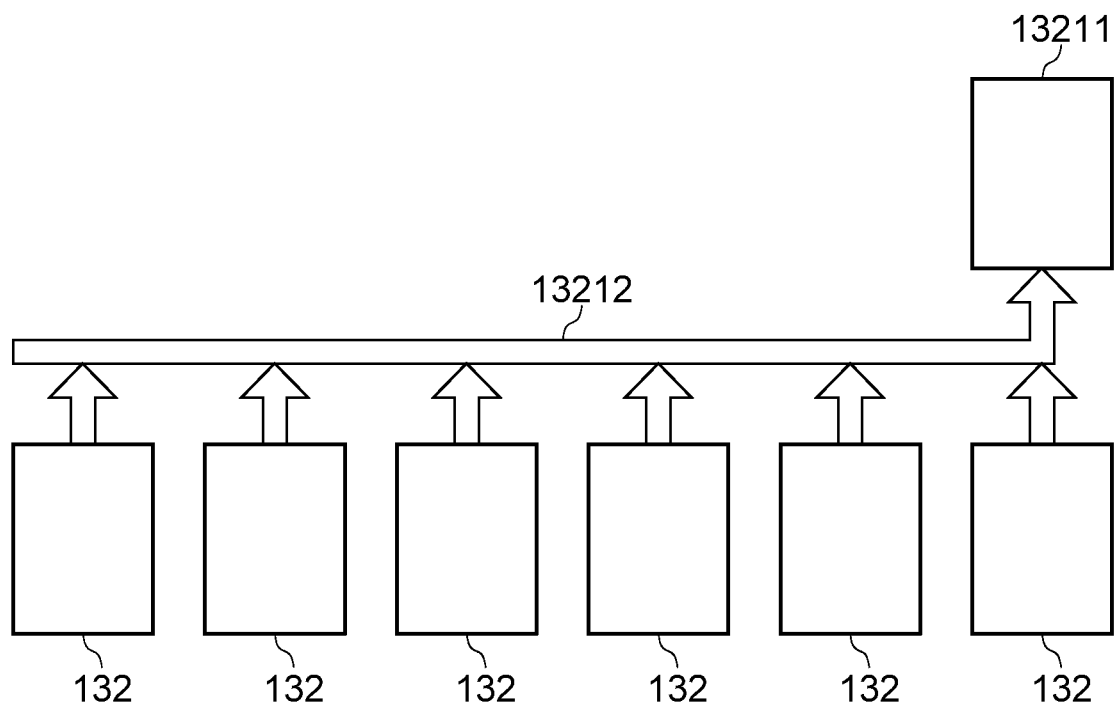
FIG. 32 shows a view of a configuration of a collecting system of an eleventh embodiment of the present invention.

FIG. 32 shows a view of a configuration of a collecting system of an eleventh embodiment of the present invention. In the above embodiment, the collection accommodating portion is provided independently for each betting terminal 102, and the collection accommodating portions 132 of the plurality of betting terminals 102 are not connected to the outside.

In the present embodiment, gaming chips C collected in the collection accommodating portions 132 of the plurality of betting terminals 102 are collected in a central collection accommodating portion 13211, as shown in FIG. 32. In the collecting system of this embodiment, a main transferring route 13212 is provided, which transfers the collected gaming chips C to the central collection accommodating portion 13211, and the gaming chips C collected in the collection accommodating portion 132 of each betting terminal 102 flow to the main transferring route 1321. That is, the central collection accommodating portion 13211 is commonly used for the plurality of betting terminals 102.

Figure 33:
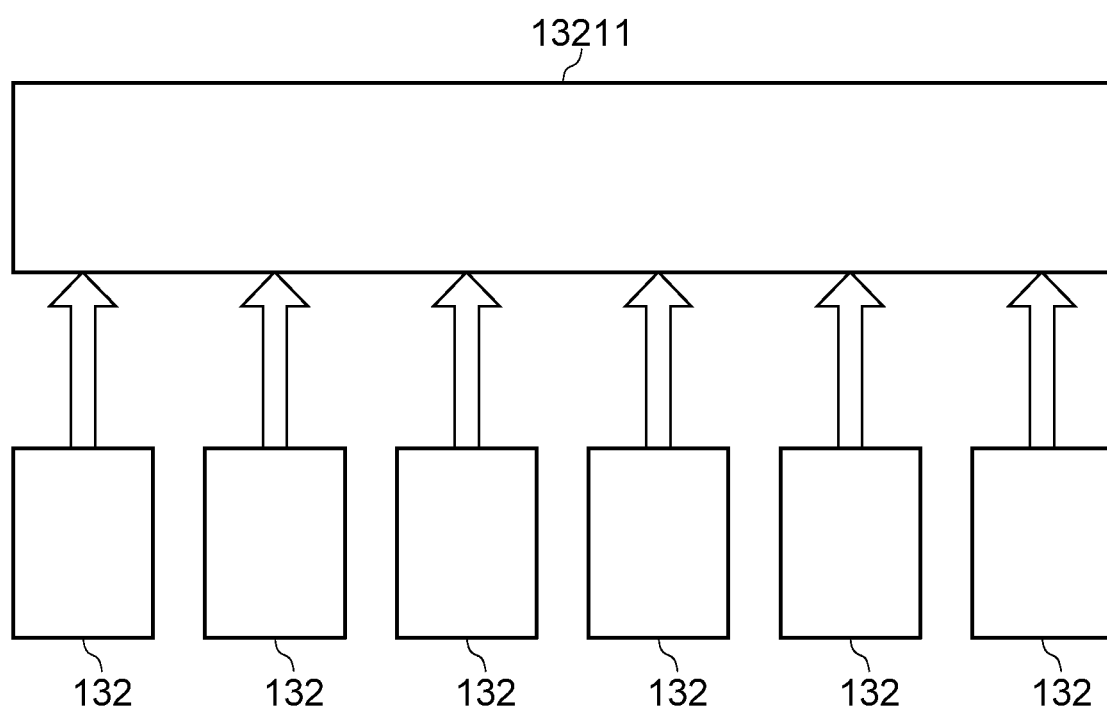
FIG. 33 shows a view of another configuration of the collecting system of the eleventh embodiment of the present invention.

FIG. 33 shows a view of another configuration of the collecting system of the eleventh embodiment of the present invention. As shown in FIG. 33, gaming chips C may be transferred by individual transferring route from the collection accommodating portion 132 of each betting terminal 102 to the central collection accommodating portion 13211.

Figure 34:
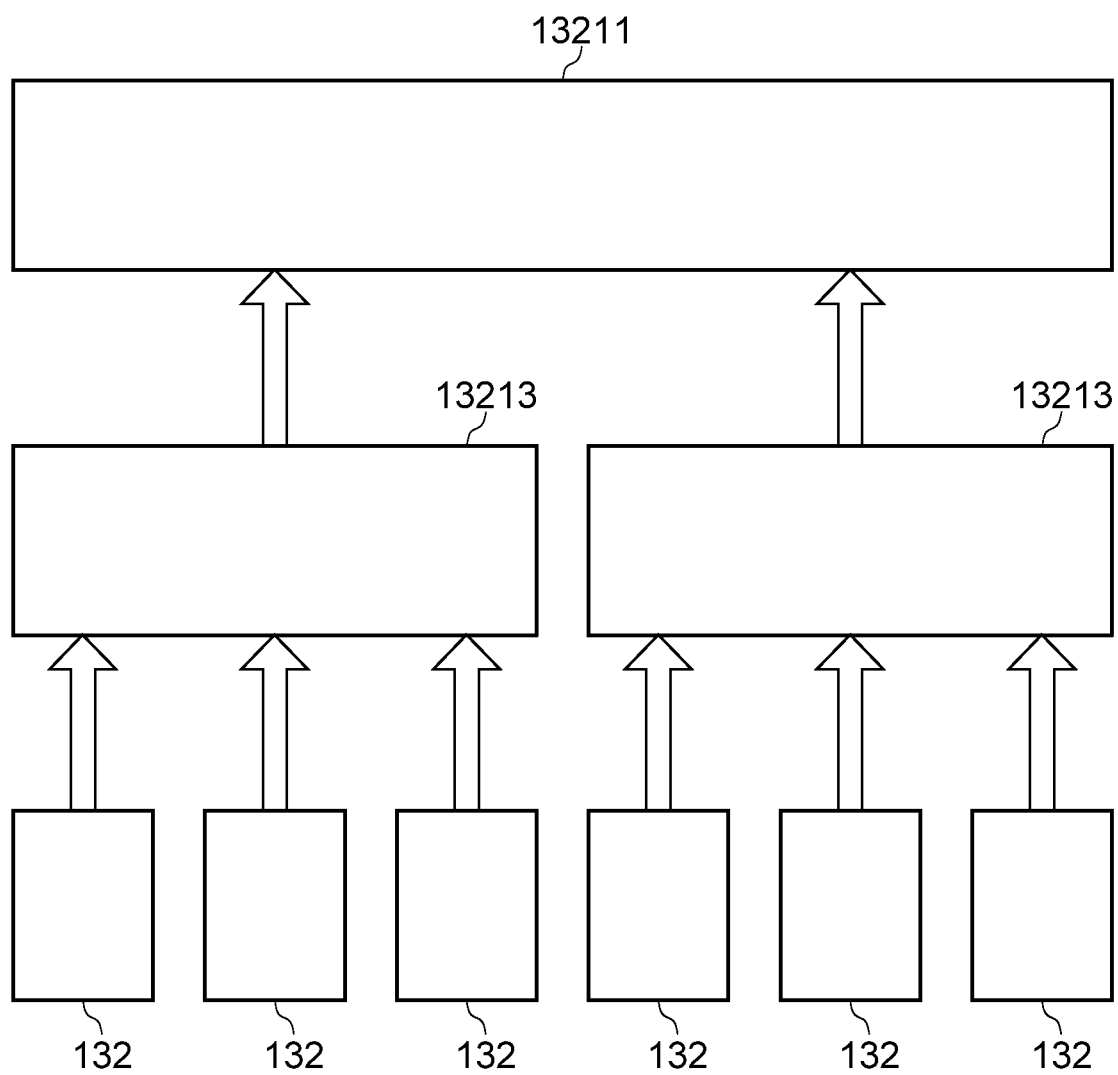
FIG. 34 shows a view of another configuration of the collecting system of the eleventh embodiment of the present invention.

FIG. 34 shows a view of another configuration of the collecting system of the eleventh embodiment of the present invention. As shown in FIG. 34, gaming chips C may be collected from the collection accommodating portion 132 of each betting terminal 102 to any of a plurality of intermediate collection accommodating portions 13213, and then the gaming chips C may be collected from the plurality of intermediate collection accommodating portions 13213 to the central collection accommodating portion 13211.

Figure 35:
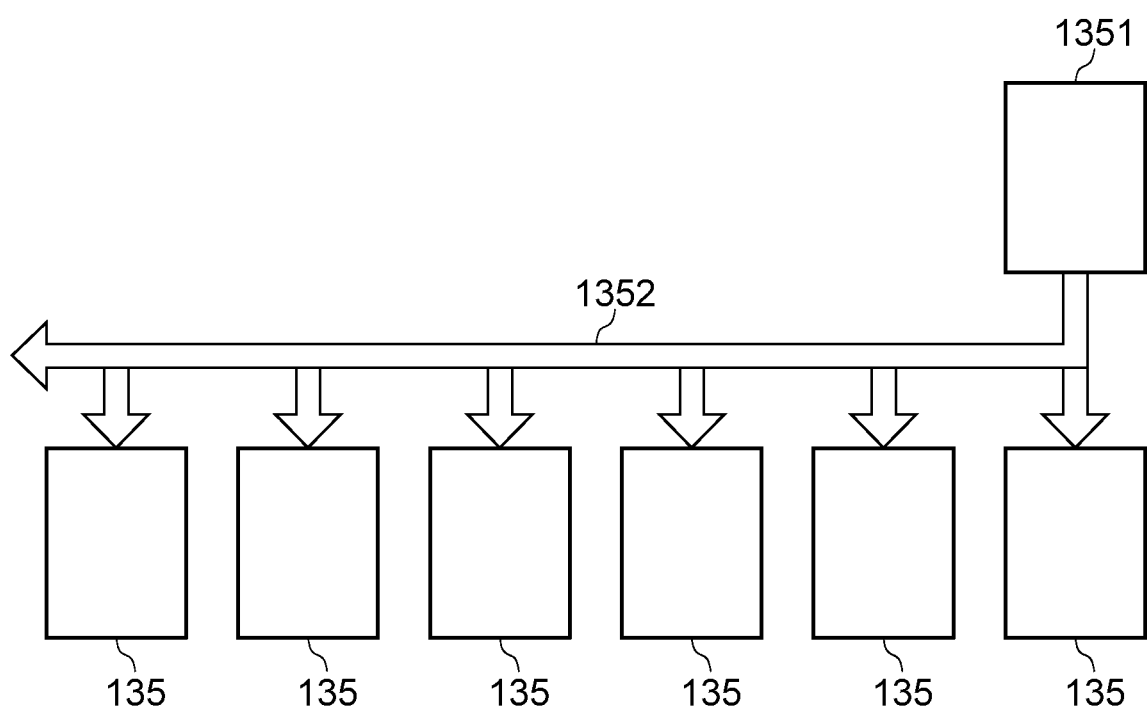
FIG. 35 shows a view of a configuration of a payment system of a twelfth embodiment of the present invention.

FIG. 35 shows a view of a configuration of a payment system of a twelfth embodiment of the present invention. In the above embodiment, the payment accommodating portion is provided independently for each betting terminal 102, and the payment accommodating portions 135 of the plurality of betting terminals 102 are not connected to the outside.

In this embodiment, as shown in FIG. 35, gaming chips C are supplied from a central payment accommodating portion 1351 to the payment accommodating portion 135 of each betting terminal 102. In this embodiment, a main transferring route 1352 is provided, which is for transferring gaming chips C transferred out from the central payment accommodating portion 1351, and the payment accommodating portion 133 of each betting terminal 102 receives the gaming chips C from the main transferring route 1352.

Figure 36:
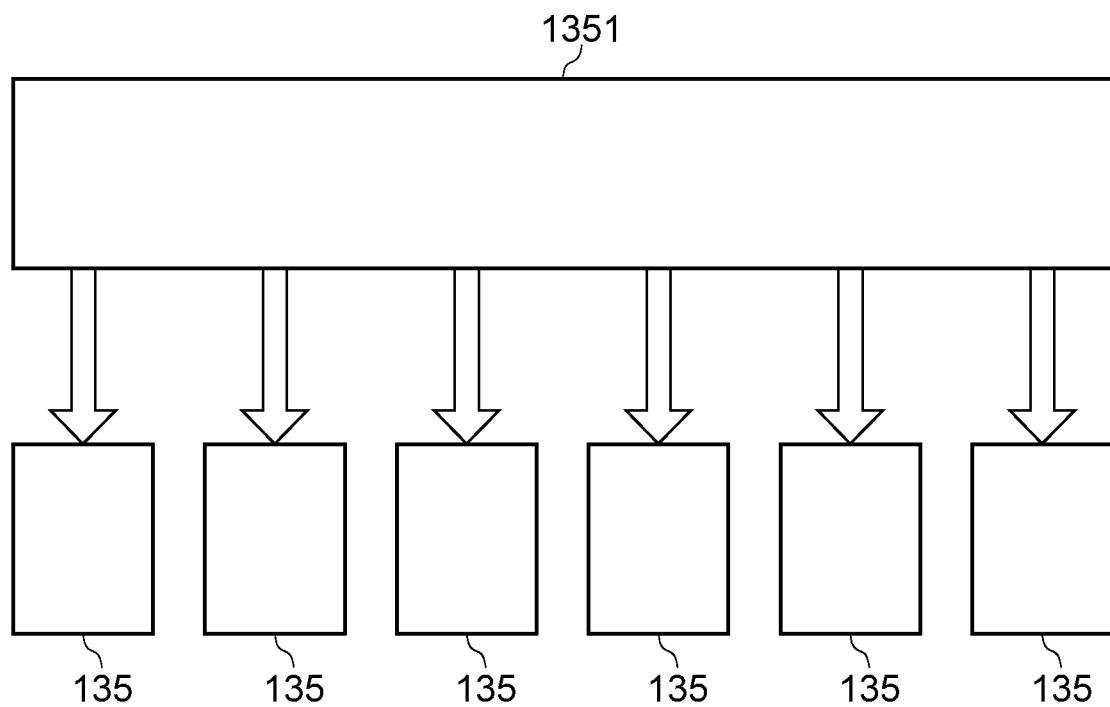
FIG. 36 shows a view of another configuration of the payment system of the twelfth embodiment of the present invention.

FIG. 36 shows a view of another configuration of the payment system of the twelfth embodiment of the present invention. As shown in FIG. 36, gaming chips C may be transferred by individual transfer route from the central payment accommodating portion 1351 to the payment accommodating portion 135 of each betting terminal 102.

Figure 37:
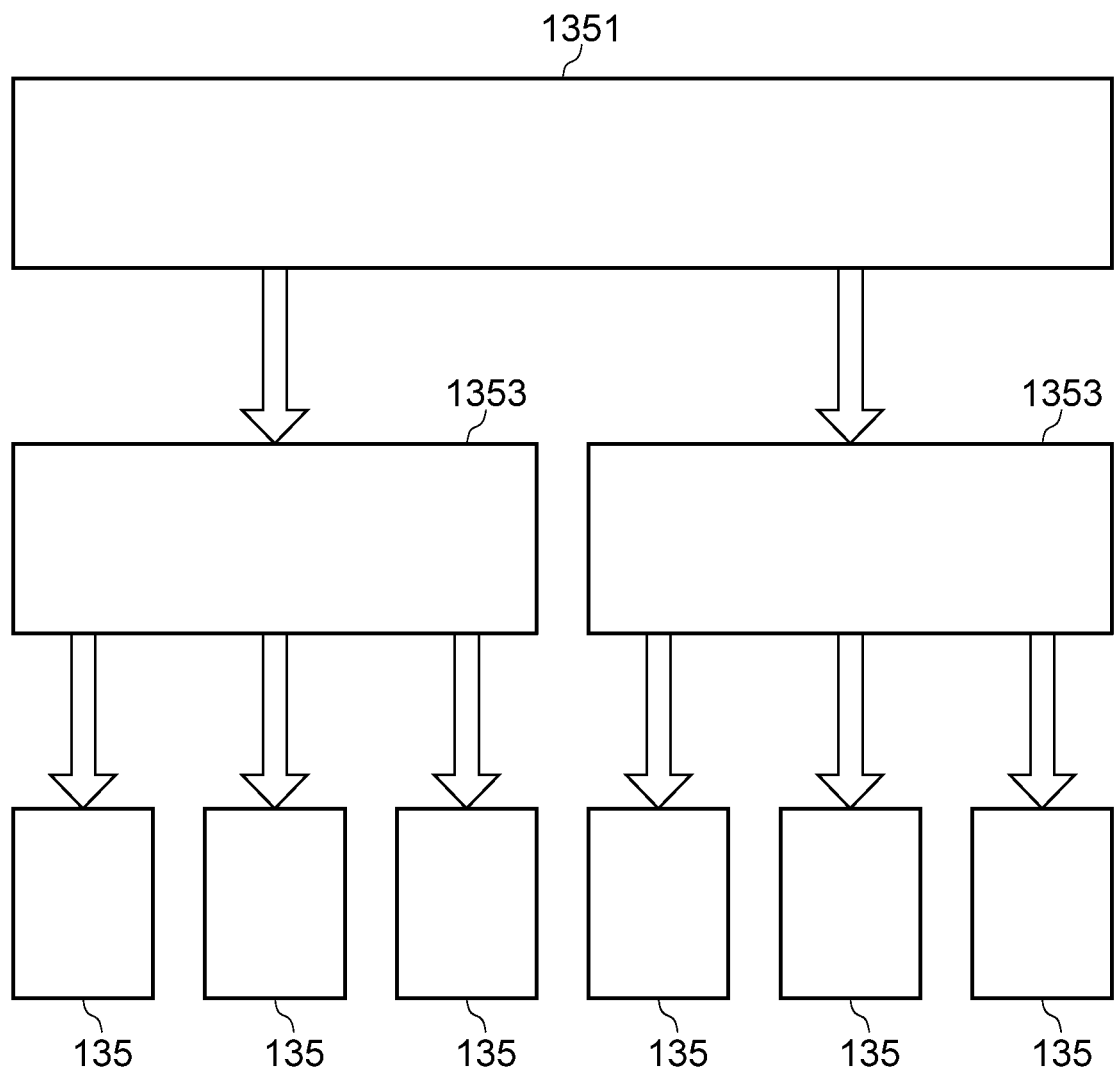
FIG. 37 shows a view of another configuration of the payment system of the twelfth embodiment of the present invention.

FIG. 37 shows a view of another configuration of the payment system of the twelfth embodiment of the present invention. As shown in FIG. 37, gaming chips C may be distributed from the central payment accommodating portion 1351 to a plurality of intermediate payment accommodating portions 1353, and then the gaming chips C may be supplied from each intermediate payment accommodating portion 1353 to each payment accommodating portion 135 of the plurality of betting terminals 102.

The above embodiments are described on the assumption that any gaming chip among a plurality of types of gaming chips C can be betted at the betting terminal 102, and however, the types of gaming chips that can be betted at one betting terminal 102 may be limited. In this case, the types of gaming chips that can be betted at one betting terminal 102 and another betting terminal 102 may be different from each other. For example, only $10 chips may be allowed to be betted in one betting terminal 102 while only $100 chips may be allowed to be betted in another betting terminal 102.

This configuration allows the betting terminal 102 to become a simplified configuration, since it is sufficient to only determine a number of betted chips for determining an amount of betted chips and also to control the number of chips in payment.

Gaming chips that can be betted in the betting terminal 102 may be a different type of gaming chips from those available at the regular game table.

In addition, a number of gaming chips that can be betted at one time in the betting terminal 102 may be limited. For example, the number of gaming chips that can be betted may be limited to five.

In the above embodiments, an example is also described, in which gaming chips C collected in each betting terminal 102 are circulated to the payment accommodating portion 135 of each betting terminal 102, and however, a configuration may be provided, which does not perform such circulation. In this case, as a number of games increases, collected gaming chips is accumulated in the collection accommodating portion 132 and gaming chips C accommodated in the payment accommodating portion 135 decrease.

Therefore, an alarm may be output from the alarming device 28 (referring to FIG. 4) when a predetermined number or more of gaming chips C are collected in the collection accommodating portion 132. Moreover, the alarm may be output from the alarming device 28 when the gaming chips accommodated in the payment accommodating portion 135 fall below a predetermined number. A quantity of gaming chips C in the collection accommodating portion 132 and the payment accommodating portion 135 may be determined by counting the number of gaming chips C accommodated, by the height of the gaming chips C accommodated in the accommodating portion, or by the weight of the gaming chips C accommodated in the accommodating portion.

In addition, in the above embodiments, the collection accommodating portion 132 and the payment accommodating portion 135 are provided as separated accommodating portions, and however, they may be common. In particular, when gaming chip C available in one betting terminal 102 is limited to only one type, the assorting device is not need, and the collection accommodating portion 132 may have the function of the payment accommodating portion 135.

In addition, in the above embodiments, the game table 101 includes the bet area in each player position and it is possible to participate in the baccarat game in the game table 101, and however, the game table 101 may be used only for dealing playing cards by a dealer and not includes a bet area for betting by a player.

Furthermore, in the above embodiments, the example is described, in which the game table 101 and the plurality of betting terminals 102 are provided in the same casino hall, and however, the game table 101 may be located in a remote place. In this case, the internet may be provided between the communicating device 17 and the communicating device 25, and the communicating device 17 and the communicating device 25 may communicate according to internet protocols.

In addition, in this case, the large monitor 103 is arranged in the casino hall together with the plurality of betting terminals 102, and the images of the card imaging camera 11 and the squeeze imaging camera 12 may be displayed on the large monitor 103.

In addition, in the above embodiments, the cover member 128 is provided to prevent a player from physically touching the betted chips, and the alarm is outputted when it is detected that the cover member 128 opens, or the player touches or almost touch the cover member 128, and however, alternatively, for example, the fraud may be detected by detecting that an object enters into the bet area and the area over the bet area by a laser sensor.

In addition, in the above embodiments, various guides may be displayed on the chip placing surface 123. In this case, the chip placing surface 123 itself may be a display, a light source such as a display or an LED lamp may be arranged on the rear side of the chip placing surface 123, or a projection mapping may be performed on the chip placing surface 123. Content to be displayed may be, for example, guide information indicating timing to bet gaming chips, guide information to guide a winning bet position and so on.

In addition, in the above embodiments, the betting terminal 102 may include a cleaning device that cleans gaming chips collected and/or paid out. The cleaning device may clean the gaming chips by irradiating the gaming chips with UV to sterilize the surface thereof, or may wash the gaming chips with a washing agent.

In the above embodiments, the following Appendices 1-7 inventions are also disclosed.

(Appendix 1) A system for presenting guide information of a baccarat game to a player, comprising: a hand judging device configured to judge a player hand and a banker hand turned face up in the baccarat game, a guiding device configured to determine a relationship between some or all of information on a rank of a playing card to be revealed by a squeeze and a game result regarding the playing card being face down based on a rule of the baccarat game; and a monitor configured to display the relationship determined by the guiding device.

(Appendix 2) A system for presenting guide information of a baccarat game to a player, comprising: a hand judging device configured to judge a player hand and a banker hand turned face up in the baccarat game, a guiding device configured to determine a relationship between possibilities of rank of a playing card being face down and a game result based on a rule of the baccarat game; and a monitor configured to display the relationship determined by the guiding device.

(Appendix 3) A system for presenting guide information of a baccarat game to a player, comprising: a hand judging device configured to judge a player hand and a banker hand turned face up in the baccarat game; and a monitor configured to display the player hand and the banker hand judged by the hand judging device.

(Appendix 4) A game system for a game being played by betting a gaming chip, comprising: a collection accommodating portion configured to accommodate the gaming chip collected from a player who loses the game; a payment accommodating portion configured to accommodate the gaming chip to be paid out to a player who wins the game, and a first detecting means configured to detect that the collection accommodating portion accommodates a predetermined number or more of gaming chips; and a second detecting means configured to detect that the payment accommodating portion accommodates a predetermined number or less of gaming chips; and an alarming means configured to output an alarm in accordance with the detection results of the first detecting means and the second detecting means.

(Appendix 5) A game system for a game played by betting a gaming chip, comprising: a collection accommodating portion configured to accommodate the gaming chip collected from a player who lost the game; a first detecting means configured to detect that the collection accommodating portion accommodates a predetermined number or more of gaming chips; and an alarming means configured to output an alarm in accordance to the detection result of the first detecting means.

(Appendix 6) A game system for a game played by betting a game chip, comprising: a payment accommodating portion configured to accommodate the gaming chip to be paid out to a player who wins the game, and second detecting means configured to detect that the payment accommodating portion accommodates a predetermined number or less of gaming chips; and an alarming means configured to output an alarm in accordance to the detection result of the second detecting means.

(Appendix 7) A fraud detecting system, comprising: a bet recognizing means configured to recognize a betted gaming chip; a fraud detecting means configured to detect that a player touches or almost touches the betted gaming chip at least during a period after a game is started and until a game result is decided; and an output means configured to output the detection results of the fraud detecting means.

The invention claimed is:

1. A game system for participating in a baccarat game, comprising:
   a plurality of betting terminals separated from a game table, including a bet area including a plurality of bet targets including a player win area and a banker win area, and in which a bet is performed by placing a physical token at any of the bet targets;
   a bet determining device configured to determine the bet target at which the physical token is placed and an amount thereof; and
   a settlement device configured to collect the bet physical token or pay out for the bet physical token based on the bet target and the amount determined by the bet determining device and a result of the baccarat game, and
   wherein the physical token includes an RFID tag, and the bet determining device is configured to read the RFID tag of the physical token to determine the bet target at which the physical token is placed and the amount thereof, and/or
   the bet determining device includes a camera configured to image the physical token placed at the bet area, and an image analyzing device configured to analyze the image of the camera to determine the bet target at which the physical token is placed and the amount thereof, and wherein the settlement device includes a collection accommodating portion configured to accommodate the collected physical token, a collecting and moving means configured to move the physical token lost by a player in the baccarat game to the collection accommodating portion, a payment accommodating portion configured to accommodate the physical token to be paid out, and a payment moving means configured to move the physical token to be paid out for the physical token won by the player in the baccarat game from the payment accommodating portion.

2. The game system according to claim 1, wherein the payment moving means includes a movable bet area at which the bet physical token is placed, or a pushing-out member configured to apply to and move the bet physical token.

3. The game system according to claim 1, wherein the collection accommodating portion is provided independently for each betting terminal.

4. The game system according to claim 1, wherein plurality of betting terminals is arranged side by side, the collection accommodating portion is common to the plurality of betting terminals, and the collecting and moving means includes a collecting mechanism configured to collect the physical token from each of the plurality of betting terminals and move the physical token to the collection accommodating portion.

5. The game system according to claim 4, further comprising:
a central collection accommodating portion configured to collect the physical token collected from a plurality of the collection accommodating portions; and
a central collecting mechanism configured to collect the physical token from each of the plurality of collection accommodating portions and move it to the central collection accommodating portion.

6. The game system according to claim 1, wherein the payment accommodating portion is provided independently for each betting terminal.

7. The game system according to claim 1, wherein the payment accommodating portion and the collection accommodating portion are common.

8. The game system according to claim 1, further comprising a transferring means configured to transfer the physical token accommodated in the collection accommodating portion to the payment accommodating portion.

9. The game system according to claim 8, further comprising an assorting means configured to assort the physical token collected in the collection accommodating portion by an amount thereof and accommodate it in the payment accommodating portion.

10. The game system according to claim 1, wherein the betting terminal includes a fraud preventing device preventing a bet from being changed at least during a game.

11. The game system according to claim 10, wherein the fraud preventing device includes a cover member configured to cover the physical token to prevent a player from touching the bet physical token.

12. The game system according to claim 11, wherein the cover member is configured to move to a position where the cover member covers the bet physical token before a bet is completed and a game begins, and retreat to a position where the player can touch the paid-out physical token at the latest after a settlement of the game is completed.

13. The game system according to claim 10, wherein the fraud preventing device includes an alarming device configured to output an alarm at least when the bet physical token is changed during the game.

14. The game system according to claim 10, wherein the fraud preventing device includes an alarming device configured to output an alarm at least when the player touches or tries to touch the bet physical token during the game.

15. The game system according to claim 1, wherein a plurality of types of the physical token can be betted in the betting terminal.

16. The game system according to claim 1, further comprising:
a table at which a playing card of the baccarat game is dealt; and
a game result judging device configured to judge a result of the baccarat game.

17. The game system according to claim 16, wherein the game table includes a bet area including a plurality of bet targets including a player win area and a banker win area and a plurality of playing positions for betting by placing a physical token on the bet targets.

18. The game system according to claim 16, wherein the game table includes no bet area.

19. The game system according to claim 1, further comprising a monitor configured to display a baccarat game being played on the game table for a player using the betting terminal.

20. The game system according to claim 19, further comprising a camera configured to image the baccarat game on the game table, and wherein the monitor is configured to display the baccarat game imaged by the camera.

21. The game system according to claim 19, wherein the monitor is configured to display a playing card being squeezed at the game table as a display of the baccarat game.

22. The game system according to claim 19, comprising:
a hand judging device configured to judge a player hand and a banker hand turned face up; and
a guiding device configured to determine a relationship between some or all of information about a rank of a playing card to be revealed by a squeeze and a game result regarding the playing card being face down based on a rule of the baccarat game,
wherein the monitor is configured to display the relationship determined by the guiding device as a display of the baccarat game.

23. The game system according to claim 19, wherein the monitor is configured to display at least an amount of each physical token being betted at the plurality of betting terminals.

24. The game system according to claim 1, further comprising a card reader configured to read a member card to identify a player associating with the betting terminal, wherein the card reader is configured to read the member card to identify the player playing in the betting terminal.

25. The game system according to claim 1, further comprising:
a camera configured to image a face of a player playing in the betting terminal; and
an analyzing device configured to analyze the face image imaged by the camera to identify the player playing in the betting terminal.

26. The game system according to claim 1, further comprising:
a camera configured to image at least the betting terminal including the bet area and at least a portion of a player playing in the betting terminal; and a recording device configured to record the image imaged by the camera.

\* \* \* \* \*